(12) United States Patent
Nahum et al.

(10) Patent No.: US 11,610,050 B2
(45) Date of Patent: Mar. 21, 2023

(54) CROSS-DOMAIN STORAGE

(71) Applicant: Walkme LTD., Tel Aviv (IL)

(72) Inventors: Nir Nahum, Tel Aviv (IL); Stephanie Tamar Jean, Tel Aviv (IL); Francisco Garcia Navarro, Alicante (ES)

(73) Assignee: Walkme LTD., Tel Aviv (IL)

( * ) Notice: Subject to any disclaimer, the term of this patent is extended or adjusted under 35 U.S.C. 154(b) by 0 days.

(21) Appl. No.: 17/354,315

(22) Filed: Jun. 22, 2021

(65) Prior Publication Data

US 2022/0405462 A1 Dec. 22, 2022

(51) Int. Cl.
*G06F 40/143* (2020.01)
*G06F 3/0483* (2013.01)
*G06F 16/957* (2019.01)
*G06F 9/451* (2018.01)

(52) U.S. Cl.
CPC .......... *G06F 40/143* (2020.01); *G06F 3/0483* (2013.01); *G06F 9/453* (2018.02); *G06F 16/9577* (2019.01)

(58) Field of Classification Search
CPC ...... G06F 40/143; G06F 3/0483; G06F 9/453; G06F 16/9577
See application file for complete search history.

(56) References Cited

U.S. PATENT DOCUMENTS

| | | | | |
|---|---|---|---|---|
| 2008/0177994 A1* | 7/2008 | Mayer | | G06F 16/00 709/224 |
| 2010/0077327 A1* | 3/2010 | Pulsipher | | G06Q 10/10 715/764 |
| 2010/0125623 A1* | 5/2010 | Rice | | G06F 16/958 709/202 |
| 2013/0031462 A1* | 1/2013 | Calvo | | G06F 11/1482 715/234 |
| 2016/0335138 A1 | 11/2016 | Surti et al. | | |
| 2019/0068723 A1 | 2/2019 | Drasin | | |
| 2020/0356610 A1 | 11/2020 | Coimbra et al. | | |
| 2021/0232647 A1 | 7/2021 | Abrahami | | |

FOREIGN PATENT DOCUMENTS

CN 102307220 A 1/2012

OTHER PUBLICATIONS

International Search Report from PCT/IL2022/050526 dated Aug. 16, 2022, 24 pgs.

* cited by examiner

*Primary Examiner* — Keith D Bloomquist
(74) *Attorney, Agent, or Firm* — Tutunjian & Bitetto, P.C.

(57) ABSTRACT

A method, system and product including a browser configured to render pages, wherein the browser comprises a client-side execution engine, wherein the browser is configured to execute an extension for the browser, wherein the extension is a computer program product that has a memory storage that is external to the client-side execution engine of the browser; and a set of pages that is defined over multiple domains, wherein the set of pages comprises respective instances of an additive software layer that is configured to execute a walkthrough over the multiple domains, wherein a page of the set of one or more pages comprises an instance of the respective instances and a communication element that is configured to enable the instance of the additive software layer to communicate data to and from the extension.

26 Claims, 6 Drawing Sheets

CROSS-DOMAIN STORAGE

TECHNICAL FIELD

The present disclosure relates to memory storage in general, and to cross-domain storage that is available to client-side code that is executed by a browser, in particular.

BACKGROUND

Cross-domain storage is often used in web-based applications, for various reasons and functionalities. One notable implementation is that of "cookie", a data that is stored on the user's computer by the browser. According to Wikipedia: "Cookies were designed to be a reliable mechanism for websites to remember stateful information (such as items added in the shopping cart in an online store) or to record the user's browsing activity (including clicking particular buttons, logging in, or recording which pages were visited in the past). They can also be used to remember pieces of information that the user previously entered into form fields, such as names, addresses, passwords, and payment card numbers". Cookies are used for various functionalities, including session management, personalization, and tracking.

In some cases, cookies can be used for cross-domain storage, such as using third-party cookies. According to Wikipedia: "Normally, a cookie's domain attribute will match the domain that is shown in the web browser's address bar. This is called a first-party cookie. A third-party cookie, however, belongs to a domain different from the one shown in the address bar. This sort of cookie typically appears when web pages feature content from external websites, such as banner advertisements. This opens up the potential for tracking the user's browsing history and is often used by advertisers in an effort to serve relevant advertisements to each user . . . . Most modern web browsers contain privacy settings that can block third-party cookies, and some now block all third-party cookies by default—as of July 2020, such browsers include Apple Safari™, Firefox™, and Brave™. Safari™ allows embedded sites to use Storage Access API to request permission to set first-party cookies. In May 2020, Google Chrome™ introduced new features to block third-party cookies by default in its Incognito mode for private browsing, making blocking optional during normal browsing."

BRIEF SUMMARY

One exemplary embodiment of the disclosed subject matter is a system comprising: a browser configured to render pages, wherein the browser comprises a client-side execution engine configured to execute code embedded in the pages, wherein the browser is configured to execute an extension for the browser, wherein the extension is a computer program product that has a memory storage that is external to the client-side execution engine of the browser; and a set of one or more pages that is defined over multiple domains, wherein the set of one or more pages comprises respective instances of an additive software layer, wherein the additive software layer is configured to execute a walk-through over the multiple domains, wherein a page of the set of one or more pages comprises an instance of the respective instances, wherein the page comprises a communication element, wherein the communication element is configured to enable the instance of the additive software layer to communicate data to and from the extension, wherein the instance of the additive software layer is configured to retrieve data from the memory storage of the extension by sending a retrieval message from the instance to the communication element, wherein the communication element is configured to send the retrieval message to the extension, wherein the extension is configured to retrieve indicated data from the memory storage in response to receiving the retrieval message and to provide a response message to the instance of the additive software layer via the communication element, and wherein the instance of the additive software layer is configured to update data in the memory storage of the extension by sending a modification message from the instance to the communication element, wherein the communication element is configured to send the modification message to the extension, wherein the extension is configured to update data in the memory storage in response to receiving the modification message.

Optionally, the extension is configured to generate the communication element and embed the communication element within the page.

Optionally, the extension is configured to verify that a domain of the page in which the communication element is to be embedded is listed in a whitelist of authorized domains, wherein the extension is configured to generate the communication element in response to a verification that the domain of the page is listed in the whitelist of authorized domains.

Optionally, the system may be configured to synchronize data of in-memory storages of the respective instances of the additive software layer with the memory storage of the extension.

Optionally, the extension may be configured to indicate an updated version of the memory storage to a second instance of the additive software layer that is embedded within a second page other than the page.

Optionally, the communication element may be absent of a graphical representation, whereby the browser does not display a graphical representation of the communication element in the pages that are rendered by the browser.

Optionally, the communication element may be configured not to retain any data that is to be transferred cross-domains.

Optionally, the extension may be configured to verify that communications obtained from the communication element originate from the additive software layer.

Optionally, the additive software layer may be configured to verify that communications obtained from the communication element originate from the extension.

Optionally, the extension may be configured to, in response to receiving the retrieval message: determine that the indicated data of the retrieval message corresponds to a data record of the memory storage; locate the data record within the memory storage; and generate the response message to comprise the data record.

Optionally, the extension may be configured to, in response to receiving the modification message: determine that the modification message is configured to update a data record of the memory storage with a new value; locate the data record within the memory storage; update the data record with the new value; generate an update message indicating the data record with the new value; and provide the update message to at least a portion of the respective instances of the additive software layer, wherein the portion of the respective instances comprises a second instance that is different from the instance.

Optionally, the modification message may comprise a delete message, wherein the extension may be configured to, in response to receiving the delete message: determine that the delete message is configured to delete a data record of the memory storage; locate the data record within the memory storage; delete the data record; generate an update message comprising an indication of the data record that was deleted; and provide the update message to a second instance of the additive software layer, wherein the respective instances of the additive software layer comprise the second instance.

Optionally, the walkthrough may be configured to provide a first descriptive element in response to a first user interaction in the set of one or more pages and to provide a second descriptive element in response to a second user interaction in the set of one or more pages, wherein the multiple domains comprise a first domain and a second domain, wherein the first interaction is directed at the first domain, wherein the second interaction is directed at the second domain, wherein the instance of the additive software layer is configured to: in response to obtaining an indication of the first user interaction with the first domain, provide the first descriptive element over the page; update an in-memory storage of the instance to indicate that the first user interaction and the first descriptive element have been implemented; and notify the extension that the first user interaction and the first descriptive element have been implemented, wherein said notify comprises providing the modification message to the communication element.

Optionally, elements that are associated with the first and second domains may be embedded within the page, wherein the instance is configured to provide the first and second descriptive elements over the page, wherein the notification performed by the instance of the additive software layer is performed via the communication element.

Optionally, the page may be associated with the first domain, wherein a second page of the set of one or more pages is associated with the second domain, wherein a second instance of the additive software layer is executed over the second page to provide the second descriptive element over the second page, wherein a second communication element is embedded within the second page, wherein upon providing the second descriptive element by the second instance, the modification message is provided from the second instance to the second communication element.

Optionally, the extension may be configured to, upon being notified that the first user interaction and the first descriptive element have been implemented, modify the memory storage to indicate that the first user interaction and the first descriptive element have been implemented, and update the respective instances with a modified version of the memory storage, wherein the modified version indicates a current state of the walkthrough.

Optionally, the communication element may be configured to: monitor browser events within the page; and forward the browser events to the extension.

Optionally, the communication element may comprise an Inline Frame (iframe) element.

Another exemplary embodiment of the disclosed subject matter is a computer program product comprising a non-transitory computer readable storage medium retaining program instructions, which program instructions when read by a processor, cause the processor to implement a method at an extension to a browser, the browser comprising a client-side execution engine configured to execute code embedded in pages, wherein the browser is configured to execute the extension, wherein the extension has a memory storage that is external to the client-side execution engine of the browser, the method comprising: utilizing a communication element for synchronizing data between an instance of an additive software layer and the extension, wherein the communication element is embedded within a page of a set of one or more pages, wherein the instance of the additive software layer is embedded within the page, wherein the set of one or more pages is defined over multiple domains, wherein the set of one or more pages comprises respective instances of the additive software layer, wherein the additive software layer is configured to execute a walkthrough over the multiple domains, wherein the communication element is configured to enable the instance of the additive software layer to communicate data to and from the extension, wherein said synchronizing the data comprises: receiving, via the communication element, a modification message from the instance of the additive software layer, wherein the modification message is configured to update data in the memory storage of the extension; in response to receiving the modification message, updating the data in the memory storage according to the modification message; and providing an updated version of the memory storage to at least a portion of the respective instances of the additive software layer.

Yet another exemplary embodiment of the disclosed subject matter is a method to be implemented at an extension to a browser, the browser comprising a client-side execution engine configured to execute code embedded in pages, wherein the browser is configured to execute the extension, wherein the extension is a computer program product that has a memory storage that is external to the client-side execution engine of the browser, the method comprising: utilizing a communication element for synchronizing data between an instance of an additive software layer and the extension, wherein the communication element is embedded within a page of a set of one or more pages, wherein the instance of the additive software layer is embedded within the page, wherein the set of one or more pages is defined over multiple domains, wherein the set of one or more pages comprises respective instances of the additive software layer, wherein the additive software layer is configured to execute a walkthrough over the multiple domains, wherein the communication element is configured to enable the instance of the additive software layer to communicate data to and from the extension, wherein said synchronizing the data comprises: receiving, via the communication element, a modification message from the instance of the additive software layer, wherein the modification message is configured to update data in the memory storage of the extension; in response to receiving the modification message, updating the data in the memory storage according to the modification message; and providing an updated version of the memory storage to at least a portion of the respective instances of the additive software layer.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
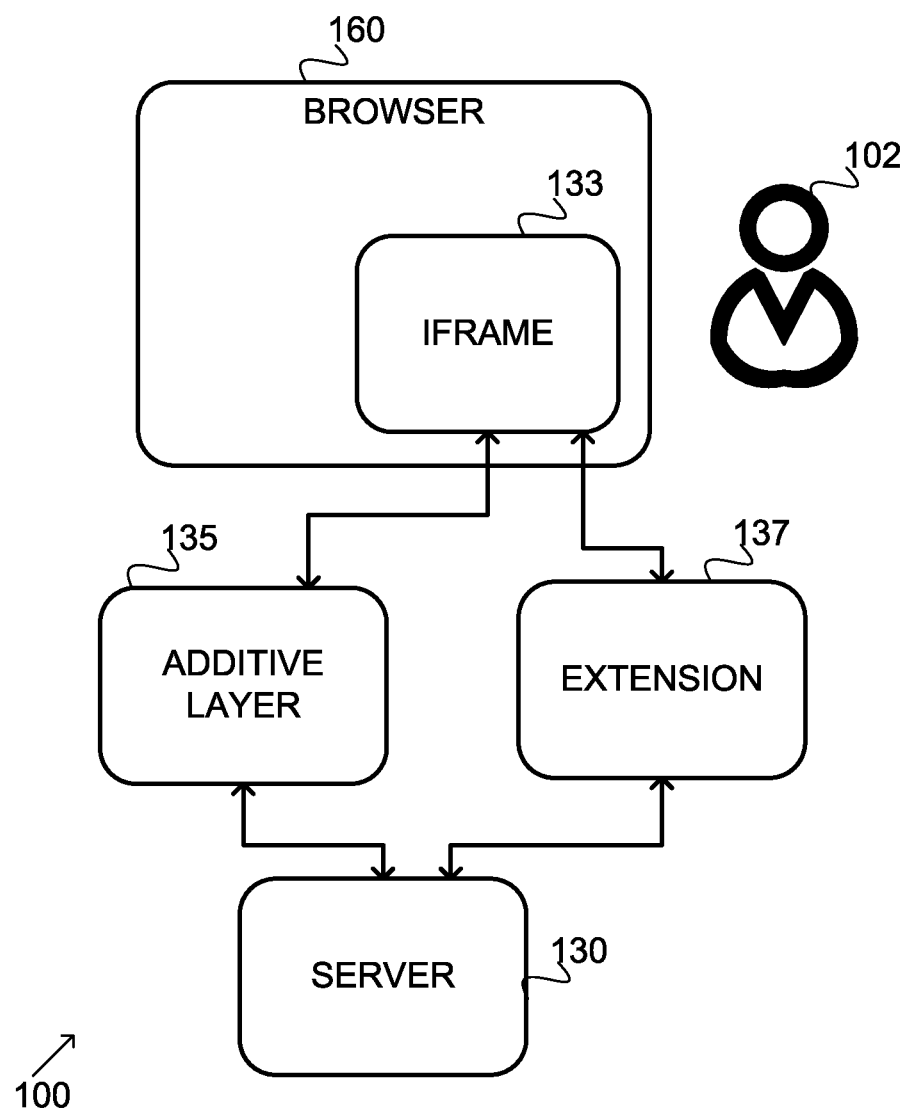
FIG. 1 illustrates an exemplary environment in which the disclosed subject matter may be implemented, in accordance with some exemplary embodiments of the disclosed subject matter.

One technical problem dealt with by the disclosed subject matter is enabling to monitor and/or store cross-domain events in a browser, and specifically by a third-party. In some exemplary embodiments, various software applications (also referred to as 'additive layers' or 'additive software layer') such as agents for implementing walkthroughs may be configured to provide a cross-domain functionality over a multi-domain environment. In some exemplary embodiments, a multi-domain environment may comprise a page that renders a plurality of contents associated with different domains, origins, or the like, a browser session that comprises multiple pages of multiple domains, or the like. For example, a multi-domain page may comprise a main content such as an article associated with a first domain, e.g., the New York Times™, a media portion such as an advertisement media associated with a second domain of an advertiser, and a reaction element enabling to react to the media which may be associated with a third domain such as a social network.

In some exemplary embodiments, in order to provide a cross-domain functionality in a multi-domain environment, it may be necessary to enable additive software layers to track or monitor user interactions and provide such tracking information across domains in the environment. For example, in order to provide or execute a walkthrough over the multi-domain page described in the previous example, it may be necessary to monitor a user's interaction with the article, provide a descriptive element such as an instruction thereto, identify a subsequent user interaction with the media, identify a subsequent user interaction with the reaction element, and provide a descriptive element such as an instruction thereto. In some exemplary embodiments, in order to guide the user through a page, the additive software layer of the walkthrough may need to detect a current step of the walkthrough that is being performed by the user, detect a current state of the walkthrough even in case it is implemented in a different domain, or the like. Without this information, it may be impossible for the walkthrough to function properly.

In some exemplary embodiments, walkthroughs may be configured to enhance existing Graphical User Interfaces (GUIs) of existing applications. In some exemplary embodiments, walkthroughs may include in-application (in-app) walkthroughs that are limited to a single application; cross-application walkthroughs that guide the user through the use of several different applications; or the like. In some exemplary embodiments, walkthroughs may be implemented over desktop applications, running on WINDOWS™, OSX™, or the like. In some exemplary embodiments, walkthroughs may be implemented over native mobile applications, e.g., running on iOS™, ANDROID™, or the like. In some exemplary embodiments, walkthroughs may be implemented over web-based applications, which can be processed by browser execution environment such as by GOOGLE CHROME™, CHROMIUM™, FIREFOX™, or the like. In some exemplary embodiments, the current subject matter is not be limited to walkthroughs, and any cross-domain additive software layer may be implemented instead of a walkthrough. For example, the disclosed subject matter may be implemented with any functionality enhancements, such as but not limited to, augmenting the GUI with additional functionality, providing automated execution of processes via the GUI, tracking user activities, or the like. In some cases, the functionality enhancement may rely on previously stored user preferences which may be available in different domains. As another example, the functionality enhancement may retain usage information for analytics purposes, data collection purposes regarding user's activities, or the like. In order to implement such functionality, a cross-domain-persistent user identification may be stored and used over different domains and collected data may be stored with respect to the cross-domain-persistent user identification.

In some cases, browsers may store domain data of a single domain at the client device using first-party browser cookies (also referred to as Hypertext Transfer Protocol (HTTP) cookies, web cookies, Internet cookies, or cookies), which may each include a small piece of data stored on the user's computer by the web browser while browsing a website, an application, or the like. In some exemplary embodiments, the cookie mechanism of the browser may enable websites to record stateful information such as items added in the shopping cart in an online store, to record the user's browsing activity including clicking particular buttons, recording pages visited by the user, or the like. In some exemplary embodiments, the browser's storage may be used to save short term data, long term data, or the like. In some exemplary embodiments, short term data may include data that its usage is related to real time operations, e.g., a current state of a purchase, a last interaction of the user with a GUI element, or the like. In some exemplary embodiments, long term data may include data used in the context of the long term user experience, e.g., information relevant to the actions that a user has taken, completion of a given task by a user, or other actions that are persistent in time. In some exemplary embodiments, first-party cookies may be directly created and stored by a browsed page, with the browser handling the access to the cookies.

In some exemplary embodiments, browsers may implement a number of storage access policies that restrict access to cookies and site data for embedded, cross-domain resources. In some exemplary embodiments, these restrictions may range from giving domains a unique storage space, to outright blocking of storage access when resources are loaded in a third-party context. In some exemplary embodiments, in a potentially common scenario, a user may start a flow of screen interactions in one domain, for instance, in an application such as SALESFORCE™, and finish the flow it in another domain, such as by booking events in GOOGLE CALENDAR™ for an automated appointment. In some exemplary embodiments, browsers may enforce a security limitation on sharing data between domains, preventing any data sharing between domains. In some exemplary embodiments, a first domain such as WORKDAY™ may deny access to its data storage from other domains, e.g., from a second domain such as SALES- FORCE™, and they may each retain a separate storage in a separate browser cookie. In some exemplary embodiments, it may be desired to overcome these drawbacks of the browser storage.

Another technical problem dealt with by the disclosed subject matter is enabling to monitor and store cross-domain events between different domains of a single page. In some exemplary embodiments, in some scenarios, a single page may comprise elements that are associated with multiple domains such as Hypertext Markup Language (HTML) Inline Frame elements (iframes), or any other element that is associated with a domain. In some exemplary embodiments, iframes may be used to embed another document within a current HTML document. In some exemplary embodiments, in case a single page comprises multiple iframes from different domains, this may affect walkthrough users, cross-domain functionalities, or the like. In some exemplary embodiments, the iframes in the page may comprise self-contained resources or documents that may be loaded from respective domains. In some exemplary embodiments, the browsed page in which the iframes are embedded may be referred to as the parent domain, and the multiple iframes or other elements embedded within the page may be referred to as child iframes. In some exemplary embodiments, a user flow may lead a user to perform an action in the parent domain and interact with one of the child iframes, may lead a user to interact with child iframes from different domains, or the like. For example, the user may watch a video hosted in an iframe of a first domain, and then interact with a social media button hosted in an iframe of a second domain such as by selecting a "like" button. In many cases, neither of the child iframes may belong to the parent domain. In some exemplary embodiments, the paradigm of starting a flow of interactions in one domain and continuing the flow in a different domain requires to transfer real time data such as stateful information or browsing data between the parent domain, child domains, sub-domains, or the like, enabling the flow of the user interactions to be continued. In some exemplary embodiments, without being able to monitor and/or store data between domains, an additive software layer such as a cross-domain walkthrough, which may be loaded over both the parent domain and the children iframes, may not be able to orchestrate a user flow between elements loaded in different domains.

Yet another technical problem dealt with by the disclosed subject matter is enabling to monitor and store cross-domain events between different tabs or windows of a browser. In some exemplary embodiments, a user may interact with content of a first tab of a browser, and then continue her flow of interactions in a second tab of the same web browser, e.g., as part of a walkthrough. In some exemplary embodiments, starting a flow of interactions in one tab or window of a browser and continuing the flow in a different tab or window of the same browser may require transferring of data between the tabs and/or windows so that the flow of the user interactions may be continued. In some exemplary embodiments, without being able to monitor and/or store data between tabs and windows of a same browser, an additive software layer, which may be loaded over multiple browser tabs, windows, instances, or the like, of the browser, may not be able to orchestrate a user flow between the tabs and/or windows.

In some exemplary embodiments, in order to provide a third-party functionality over multiple domains, a naïve solution may generate a third-party cookie and store data from multiple domains in the third-party cookie. In some exemplary embodiments, third-party cookies may be set by a website or domain that is not currently browsed (e.g., the domain of the browsed page appearing in the address bar of the browser). As an example, the not-currently browsed domain may be a domain of an additive cross-domain layer such as a walkthrough. In some exemplary embodiments, the browser may handle the third-party cookie and store in the cookie content of browsed pages, e.g., domains in each page that is browsed, domains of different tabs of the browser that are active during a same session, or the like. In some exemplary embodiments, the third-party cookie may store all of the data that is relevant for the additive cross-domain layer under a common domain.

In some exemplary embodiments, third-party cookies may be set and handled using one or more iframes pointing to a third-party domain of an additive software layer such as the domain 'cdn.walkme.com' or any other domain associated with a server of the additive software layer. In some exemplary embodiments, after the iframe loads resources from the third-party domain, it may provide access to real time event of one or more domains to another domain, e.g., a domain of the additive software layer. In some exemplary embodiments, the cross-domain data may be stored in the common domain of the iframe that has access to multiple domains, e.g., SALESFORCE™ and WORKDAY™. In some exemplary embodiments, the created iframe may also be referred to as Cross Domain Hidden Iframe (CDHI), and may be loaded in one or more browsed pages. In some exemplary embodiments, the iframe may contain logic to store data from other domains and provide data access to the server of the additive software layer. In some exemplary embodiments, the cross-domain data may be stored at the third-party domain of the iframe, e.g., at its third-party cookie, thereby enabling instances of the additive software layer to obtain the cross-domain data of a user. In some exemplary embodiments, the iframe may store data from multiple domains in the cookie and enable instances of an additive software layer such as a walkthrough or any other software application to read and update data from the domains.

In some exemplary embodiments, this naïve solution may have one or more drawbacks, such as but not limited to privacy-related drawbacks. In some exemplary embodiments, due to one or more privacy issues arising from usage of the third-party cookies, web browsers may prohibit or limit the usage of third-party cookies. In some exemplary embodiments, third-party cookies may not always be available, may be blocked, or the like, e.g., by a browser rendering a page, or by any other entity, which may prevent the third-party iframe from using the third-party cookie for performing storage operations. Some browsers may implement various restrictions on third-party cookies. In some exemplary embodiments, cross-origin iframes or resources embedded in a third-party context may not be given access to the same cookies and site storage that they would have access to when loaded in a first-party context, and in some cases may be blocked, disabled, or the like. It may be desired to overcome these drawbacks.

Yet another technical problem dealt with by the disclosed subject matter is enabling to monitor and store cross-domain events in a browser without causing any security issues. In some exemplary embodiments, a naïve solution to the security issue of third-party cookies may comprise using a Storage Access Application Programming Interface (API) (Storage Access API) technique that is configured to request storage privileges from third-party cookies or iframes. In some exemplary embodiments, Storage Access API techniques may enable embedded, cross-origin iframes or resources to gain unrestricted access to storage that it would normally only have access to in a first-party context. In some exemplary embodiments, the third-party iframes may be configured to determine whether they currently have access to a first-party storage of a certain domain, and in case they do not, to request unrestricted access to the first-party storage from the user agent on a site-by-site basis. In some exemplary embodiments, by requesting storage privileges from each domain, Storage Access API techniques may enable to store cross-domain events. However, Storage Access API techniques may have one or more drawbacks. In some exemplary embodiments, Storage Access API techniques may be highly intrusive, e.g., as it configures the embedded resource to request storage access from the user agent on a site-by-site basis, causing numerous requests to be constantly triggered. In some exemplary embodiments, Storage Access API techniques may not adapt well to needs of an additive software layer such as a walkthrough, making them unfeasible for additive layer implementations. In some exemplary embodiments, when using Storage Access API techniques, cross-domain additive software layers are required to visit the target domain with which the user interacts in order to store the domain's information prior to storing the associated event data. In some exemplary embodiments, visiting the target domain may not be sufficient for this purpose, and the additive software layers may be required to perform an interaction on the visited page of each domain.

In some exemplary embodiments, once a target domain is visited, the additive software layers may need to request permissions to use the parent domain with a cross-domain Uniform Resource Locator (URL) that is linked to the additive software layer, e.g., the URL of a walkthrough provider, and obtain the permissions. In some exemplary embodiments, this procedure may be required to be performed on each domain that the user crosses, including embedded domain elements, child domains, parent domains, or the like. In some exemplary embodiments, in case a memory cache or cookie of the browser is deleted, this procedure may be required to be performed once more for each domain that the user crosses. In some exemplary embodiments, it may be desired to provide a secure and feasible solution that enables additive software layers such as walkthroughs to store their stateful data or interaction data in memory regardless of the location or domain from which the additive software layer is first accessed. For example, in case the additive software layer is first accessed in a first domain of a page, it may be desired that the additive software layer will not be limited to the first domain.

One technical solution of the disclosed subject matter is to store the cross-domain data at a cross-domain storage that is external to a client-side execution engine of a browser. In some exemplary embodiments, a client-side execution engine may be configured to execute code embedded in browsed pages. In some exemplary embodiments, the cross-domain storage (also referred to as "memory storage") may be available or controlled by a client-side code that is external to the execution engine of the browser, while being executed by the browser. In some exemplary embodiments, the cross-domain storage may comprise a persistent long term storage that is non-volatile, and may be retained by the browser, independently thereof, or the like. In some exemplary embodiments, the cross-domain storage may comprise an external separate storage that is external to a JavaScript engine or any other client-side execution engine of the browser, and may be located in Random Access Memory (RAM) memory, in a disk drive, a memory chip, or the like.

In some exemplary embodiments, the cross-domain storage may be controlled and handled by an agent such as a software extension for the browser, a plugin or "add-on" of a browser, or the like, which may enable to handle storage needs of a cross-domain additive layer (also referred to as "additive layer" or "additive software layer") such as a walkthrough with high standards of security, in a fast and reliable way, and without necessarily requiring an interaction with the end user. In some exemplary embodiments, the agent may comprise a computer program product or any other form of software that has a memory storage that is external to the client-side execution engine of the browser, e.g., enabling the browser to execute the agent. In some exemplary embodiments, the agent may comprise any other software component, software development kit (SDK), or the like, which may be located in any other memory scale or hierarchy, such as in the operating system scale.

In some exemplary embodiments, a user device of a user may retain the software agent in the form of a browser extension, which may be installed by the user, by an Information Technology (IT) professional, by a third-party, automatically, or the like. In some exemplary embodiments, in some cases the extension may be installed automatically without user intervention, e.g., based on settings of the user, by an IT department that may silently install the extension for the user, based on configurations of the user device, or the like. In some exemplary embodiments, the user may utilize the user device to browse and access one or more website pages, application pages, or the like, for which an additive software layer such as a walkthrough may be configured to load its cross-layer target functionality.

In some exemplary embodiments, prior to launching an additive software layer with cross-layer functionality, e.g., during rendering of a new page by the browser, the extension may determine whether the additive software layer is configured to be utilized in the browsed page. In some exemplary embodiments, the extension may examine the URL of the currently browsed page, in order to determine whether the additive software layer is configured therefor, e.g., by comparing the URL to a list of authorized URL for which the additive software layer is configured, a domain whitelist, a domain blacklist, or the like. In some exemplary embodiments, the extension may determine whether or not the additive software layer is configured to be executed on the page in any other manner.

In some exemplary embodiments, in response to determining that the additive software layer is designated to be utilized in the page, the extension may launch or inject a communication element (also referred to as a "channel") in the browsed page. In some exemplary embodiments, the communication element may be implemented using iframe, and may be referred to as "iframe", "communication iframe" or "communication iframe element". However, it is noted that the disclosed subject matter is not limited to such embodiment and such embodiment is discussed in detail for clarity purposes only. In some exemplary embodiments, communication iframe elements may be injected or inserted into respective pages that are being rendered and are determined to execute instances of the additive software layer. In some exemplary embodiments, the creation of the communication iframe may occur prior to loading the additive software layer over the browsed page. It is noted that in some cases, the page may have the communication iframe element embedded therein a-priori and such element may not need to be dynamically injected thereto by the extension. The communication iframe element may be configured to not store any data, may not be configured to store any data, may be configured not to retain any data that is to be transferred cross-domains, may be configured to avoid interacting with the user, may not be configured to interact with the user, or the like. In some exemplary embodiments, the communication channel may comprise an empty content iframe that is not associated with any source page or document, e.g., pointing to 'about:blank', to NULL, or the like. In some exemplary embodiments, the communication iframe elements may be absent of a graphical representation, and the browser may not display graphical representations of the communication iframe elements in pages that are rendered by the browser. For example, each page in which a communication iframe element is inserted, may render the iframe invisibly without displaying any graphical representation thereof.

In some exemplary embodiments, the communication iframe element may be used strictly for communication purposes and may not contain or store persistent data. In some cases, the communication iframe may avoid from retaining over time user data, session data, or the like. In some exemplary embodiments, the iframe may be used as a communication medium that enables to maintain communications between the extension of the agent and instances of an additive software layer in one or more browsed pages browsed by the user device, enabling them to exchange messages and synchronize data via the iframe. In some exemplary embodiments, each communication iframe element may be generated and embedded within a respective browsed page for which the additive software layer is configured to be executed. In some exemplary embodiments, the communication iframe element may facilitate and establish a channel for communications between the extension and the local logic of the additive software layer, remote logic thereof, or the like.

In some exemplary embodiments, each instance of the additive software layer may retain its own storage, e.g., an in-memory storage, which may be configured to comprise a cached replica of the storage of the extension. In some exemplary embodiments, the instances of the additive software layer may utilize their in-memory storage for their operation, e.g., to implement an action or operation, to determine a response to a user interaction, to implement a portion of the walkthrough, or the like. In some exemplary embodiments, the in-memory storage of each instance of the additive software layer may be initialized with the storage data from the extension, e.g., during a handshake between the extension and the additive software layer. In some exemplary embodiments, the iframe may enable the instances of the additive software layer to update their in-memory storages with a latest version of the storage of the extension, to insert new data into the storage of the extension, or to modify the storage of the extension in any other manner via one or more communications. In some exemplary embodiments, via the iframe communications, the extension may be enabled to update all or part of the active instances of the additive software layer of a user session in response to an update to its storage. In some exemplary embodiments, the iframe may enable each instance of the additive software layer to update the extension regarding any change in its in-memory storage, or any detected change, so that the extension will be enabled to update its own storage and inform the remaining instances of the additive software layer of the change, enabling each remaining instance to update its own in-memory storage accordingly, thus keeping a memory synchronization.

In some exemplary embodiments, after a communication iframe element is loaded in a page such as a webpage, one or more instances of the additive software layer may be booted, executed, or the like, in one or more domains of the browsed page. In some exemplary embodiments, during a boot up process of an instance of the additive software layer, e.g., a walkthrough, the extension may detect whether the instance is configured to use the storage of the extension. In some exemplary embodiments, in case the instance is configured correctly to use the storage of the extension (e.g., rather than cookies), the additive software layer may search for the communication iframe element in the browsed page, detect the communication iframe element, and perform a storage initialization process or phase via the communication iframe element that is configured to update the in-memory storage of each instance with the extension's memory storage. In some exemplary embodiments, in case that the additive software layer is not configured to use the storage of the extension, the additive software layer may be configured or set to use the storage of the extension, e.g., via an instruction from the extension.

In some exemplary embodiments, the storage initialization process may comprise a handshake and an initialization phase during which a communication channel may be set and initialized. In some exemplary embodiments, the communication channel between the extension and the additive software layer may be established and used for updating both sides of the channel, e.g., the storage of the extension, and the in-memory storages of the additive layer instances. In some exemplary embodiments, the communication iframe element may be configured to enable the instances of the additive software layer to communicate data to and from the extension. For example, instances of the additive software layer may update the storage with current versions of their memory, with a type of the loaded instances, with detected events, with updated user preferences, or the like, while the instances of the additive software layer may be updated a latest version of the extension's storage which may comprise stateful information such as a state of a walkthrough, session data, a current step of a walkthrough, long-term or short-term actions that a user has completed, tasks that have been completed, messages that have been presented to the user, user preferences, user identification, long term data, short term data, a combination thereof, or the like. In some exemplary embodiments, during the storage initialization process, the in-memory storages of the instances may be initialized with an up-to-date replica of the memory storage of the extension.

In some exemplary embodiments, once the storage initialization process is completed, the desired communication environment may be set. In some exemplary embodiments, the one or more instances of the additive software layer may be launched in the page and activated, executed, or the like, by the browser. In some exemplary embodiments, the instances of the additive software layer may be defined to be embedded within a set of one or more pages that is defined over multiple domains. For example, the additive software layer may comprise a walkthrough that is configured to guide the user through the set of one or more pages over multiple domains. In some exemplary embodiments, each page of the set of one or more pages may comprise an embedded communication iframe element and may enable an execution of at least one instance of the additive software layer. In some exemplary embodiments, the additive software layer may comprise multiple instances in multiple pages, e.g., in the set of one or more pages, and each instance may retain an in-memory storage. In some exemplary embodiments, the instances of the additive software layer may be configured to perform a functionality, such as by performing one or more actions in a user interface. For example, the additive software layer may be configured to execute a walkthrough over the multiple domains. As another example, an instance of the additive software layer may perform a read operation requested by a user, by identifying requested data in the in-memory storage of the instance and presenting the data to the user. As another example, an instance of the additive software layer may perform a write operation requested by a user by inserting a user input into the in-memory storage of the instance, and updating the extension regarding an updated entry, an added entry, or the like.

In some exemplary embodiments, each page that is being rendered may cause a handshake and a storage initialization process to be performed, e.g., for one or more domains within the page. In some exemplary embodiments, each page that is being rendered may be analyzed to determine whether the additive software layer is configured to be executed thereon, and in case it is, a communication iframe element may be embedded in the page and configured, and one or more instances of the additive software layer may be embedded in the page and configured, initialized, or the like. In some cases, a single storage initialization process may be performed for multiple browsed pages. In some exemplary embodiments, with the assistance of the extension, the instances may be enabled to obtain and store the state information of the additive software layer such as a walkthrough's state information that is accumulated over multiple domains, browser tabs, windows, browsed pages, or the like, without relying on browser storage and without requiring direct interaction with the end user, e.g., after installation of the extension. In some exemplary embodiments, the extension may implement the role of the information holder, replacing the traditional browser cookies or a "localStorage" property, in which stateful data or browsing data may be stored.

In some exemplary embodiments, the instances of the additive software layer may be configured to obtain or retrieve data from the memory storage of the extension in one or more manners, such as by actively invoking retrieval messages (also referred to as "reading requests" or "read requests") to the extension via a communication iframe element of a page wherein the requesting instance is embedded, which may be performed during initialization of the in-memory storage of an instance. In some exemplary embodiments, when implementing the currently disclosed subject matter, a read request requesting to obtain an updated version of storage data may be issued by an instance of the additive software layer, and cause the extension to provide an entire version of the storage, a portion thereof, a requested entry or record, or the like, to the in-memory storage of the instance. In some exemplary embodiments, in response to receiving the retrieval message, the extension may be configured to retrieve indicated data from the memory storage and to provide a response message to the instance of the additive software layer via the communication iframe element, enabling the instance to initialize its in-memory storage. In some exemplary embodiments, upon being initialized with the storage of the extension, a replica of the extension's storage may be retained at the in-memory storage of each instance. In some exemplary embodiments, the instances may utilize their own in-memory storage in order to serve stored data to the user, to respond to user interactions, to respond to a read instruction, to respond to a write instruction, or the like.

In some exemplary embodiments, instances of the additive software layer may be configured to update or modify the memory storage of the extension in one or more manners, such as by communicating modification messages or requests to the extension via a communication iframe element. In some exemplary embodiments, an instance of the additive software layer may send a modification message to the communication iframe element that is embedded in the same page in which the instance is embedded, and the communication iframe element may be configured to send or forward the modification message to the extension. In some exemplary embodiments, in response to receiving the modification message, the extension may be configured to update data in the memory storage and to indicate an updated version of the memory storage to one or more active instances of the additive software layer other than the inquiring instance.

In some exemplary embodiments, in case that an instance of the additive software layer such as an additive layer executer implements a writing operation that updates one or more portions of the in-memory storage of the instance, the instance may forward an indication of the update to the extension to enable the extension to update its memory storage accordingly. In some exemplary embodiments, the update may be provided to the extension via the communication iframe element. In some exemplary embodiments, upon updating the extension's storage, the extension may inform the remaining instances of the update, enabling them to synchronize their storage. In some exemplary embodiments, the extension may update all of the active instances of the session including or excluding the instance that issued the update request, a portion of the active instances, or the like. In some exemplary embodiments, updating operations may cause the extension to issue an asynchronous updating execution that does not require the instance to wait for an acknowledgement. In other cases, an update instruction may include a synchronous updating execution, e.g., requiring the instance to remain idle until receiving a confirmation indicating that the task has been completed or has failed. In some exemplary embodiments, upon obtaining a response such as an acknowledgement or an update, the additive software layer may be configured to verify that communications obtained from the communication iframe element originate from the extension.

In some exemplary embodiments, creating a communication medium between instances of the additive software layer and the extension may enable the synchronization of the data from the extension to all of the in-memory storages of instances of the additive software layer. In some exemplary embodiments, the storage of the extension may be synchronized along instances of the additive software layer that may be active in various tabs, domains, or windows of the browser. In some exemplary embodiments, the extension storage and the additive software layer may cooperate with each other in order to keep a data consistency, propagating updating messages from the extension to each active instance of the additive software layer so that they all have access to the updated version of the storage, in case that the storage of the extension has been updated. In some exemplary embodiments, the data consistency may be retained for each type of operation, thereby updating active instances of the additive software layer in case that data is added, deleted, amended, or the like.

One technical effect of utilizing the disclosed subject matter is to provide a cross-domain additive layer that can be implemented over multiple domains in multiple pages, tabs, browser windows or instances, or the like. In some exemplary embodiments, the cross-domain additive layer may be implemented and utilized in environments in which third-party cookies are restricted (partially or completely). In some cases, the disclosed subject matter may enable the provisioning of the cross-domain additive layer without compromising the privacy of the end user.

Another technical effect of utilizing the disclosed subject matter is to provide a cross-domain functionality with an enhanced security level. In some exemplary embodiments, creating a dedicated communication iframe element for communications, instead of registering handlers to events on the browsed page directly, may have one or more security advantages. In some exemplary embodiments, the communication iframe element may allow the extension to indirectly monitor events in the browsed page, as well as to communicate messages between extension components and additive layer components. In some exemplary embodiments, each additive layer instance or component may register to a specific set of events, to which the extension may forward a matching event that is monitored by the communication iframe element. In some exemplary embodiments, prior to processing a request, the extension may verify that every request it receives originates from an instance of the additive software layer, that a domain of the instance is authorized, that a domain of the communication iframe element is identical to a domain or window of the instance, or the like, thereby adding additional security layers and preventing identity theft. In some exemplary embodiments, prior to processing an update or response, the additive software layer may verify that every message it receives originates from the extension, thereby adding additional security layers and preventing identity theft.

Yet another technical effect of utilizing the disclosed subject matter is to enhance a user experience (UX) of utilizing a cross-domain additive layer. In some exemplary embodiments, creating a dedicated communication iframe element used for communications, instead of registering handlers to events on the browsed page directly, may have one or more UX advantages. In some exemplary embodiments, a dedicated communication iframe element may not interrupt the events that are being handled by the browsed web page, in contrast to handlers that register directly to browser events.

Yet another technical effect of utilizing the disclosed subject matter is to provide self-hosting capabilities to a client. In some exemplary embodiments, an end user or client may host the additive layer logic or code locally or within its servers, thus reducing or eliminating a real time dependency on server communications. In some exemplary embodiments, utilizing a micro-service such as in a cloud may allow the extension or any other software agent to be stored remotely and may enable installation of the micro-service at any desired location, providing self-hosting capabilities to the client.

One technical problem dealt with by the disclosed subject matter is to enable an additive software layer to monitor events such as user interactions over different desktop applications, web browsers, or the like. In some exemplary embodiments, it may be desired to run a cross content flow, e.g., starting the flow of interactions in a first type of browser, moving to a desktop application, continuing in a second type of browser, and completing the flow in the native mobile environment of a mobile phone. Alternatively, any other flow may be desired. In some cases, in case the software agent is implemented as a browser extension, the ability to track the user outside of the browser may be limited.

For example, a user may start a walkthrough in a web browser, e.g., the SAFARI™ browser, and continue the walkthrough in a different web browser, e.g., GOOGLE CHROME™. In some exemplary embodiments, it may be desired to integrate, in addition to integrating data from different browsers, data from third-party applications that are external to the browser that the additive software layer is running on, such as desktop application, mobile applications, or the like.

One technical solution is to expand the extension for the browser in one or more manners. In some exemplary embodiments, a wider integration of the extension may be performed, such as by having one or more elevated software agents or SDKs in addition to or instead of the extension. In some exemplary embodiments, the elevated software agents may comprise one or more software components, SDKs, files, or the like, which may be located in a lower memory scale or hierarchy than the extensions, such as in the operating system scale. For example, software files of the elevated software agents may be located within files of the operating system. In some exemplary embodiments, extensions in each browser instance or type may communicate with the elevated software agents, e.g., within the operating system, such as using one or more system calls, hooks, or the like.

In some exemplary embodiments, tracked event data from each environment in the interaction flow may be gathered, aggregated, or the like, and stored at an elevated storage that is external to the environment over which the additive software layer is executed. In some exemplary embodiments, the storage may comprise a server storage at a remote server, cloud, or the like, a local storage at a desktop or operating system level, or the like, which may provide access to its data via communications with one or more of the browser extensions. In some exemplary embodiments, instead of retaining the storage at the browser extension, which accomplishes cross-domain compatibility within the browser's domain, the storage may be kept at an external location, thus accomplishing cross system compatibility outside the browser's domain.

One technical effect of utilizing the disclosed subject matter is achieving synchronization of user accounts or interactions across an entire system, including different web browsers and/or desktop applications to which a browser extension has no access. In some exemplary embodiments, the disclosed subject matter may enable to elevate the cross-domain storage in a single browser to a cross-browser cross-application storage that is external to a browser, such as in an operating system. In some exemplary embodiments, the disclosed subject matter may facilitate the external communications and expand the domain of the additive software layer.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 illustrating an environment, in accordance with some exemplary embodiments of the disclosed subject matter.

In some exemplary embodiments, Environment 100 may comprise an end device of a User 102. In some exemplary embodiments, User 102 may use a Browser 160 of the end device in order to browse one or more pages of a website, to browse one or more websites, to browse one or more application pages, or the like. In some exemplary embodiments, Browser 160 may comprise one or more active browser sessions, each enabling to browse content of one or more pages via one or more browser tabs, windows, or the like. In some exemplary embodiments, the browsed pages may comprise content from multiple domains. For example, a single page may comprise content from multiple domains such as from different publishers, advertisers, or the like. As another example, different tabs or windows in a session of Browser 160 may comprise content from different domains such as from different publishers, advertisers, or the like.

In some exemplary embodiments, Environment 100 may comprise one or more Extensions 137 that may be executed by respective Browsers 160. In some exemplary embodiments, an Extension 137 may comprise a software agent, an SDK, a computer program product, or the like, which may have a memory storage that is external to a client-side execution engine of Browser 160. In some exemplary embodiments, the client-side execution engine of Browser 160 may be configured to execute code embedded in browsed pages, to render pages, or the like. In some exemplary embodiments, Extension 137 may be associated with a third-party domain such as a provider of a cross-domain functionality. For example, Extension 137 may be provided by a Server 130 such as a walkthrough server, which may configure Extension 137 for facilitating the execution of cross-domain walkthroughs. In other cases, Extension 137 may be generated or provided by any provider of a cross-domain functionality. In some exemplary embodiments, the memory storage of Extension 137 may be retained at the Extension 137 in a location that is external to the client-side execution engine of Browser 160, which is executing the Extension 137. In some exemplary embodiments, the memory storage of Extension 137 may be used similarly to the traditional use of browser cookies, e.g., in order to track user interactions, to obtain stateful data, to obtain browser data, to retain user-specific information for future executions, to obtain long term or short term data, a combination thereof, or the like. In some exemplary embodiments, the memory storage of Extension 137 may be used for additional or alternative purposes, such as to synchronize real-time data over storages of walkthrough instances that are executed in multiple domains.

In some exemplary embodiments, Environment 100 may comprise an additive software layer such as Additive Layer 135. In some exemplary embodiments, Additive Layer 135 may be configured to provide a cross-domain functionality such as walkthrough, over the multiple domains of the pages. In some exemplary embodiments, each instance of Additive Layer 135 may retain an in-memory storage or database, which may be updated or synchronized with the storage of Extension 137. In some exemplary embodiments, Additive Layer 135 may comprise one or more instances of a cross-domain functionality such as a walkthrough. For example, an instance of a walkthrough may comprise a software component that generates one or more descriptive elements with instructions to the user over one or more domains of a page. As an example, a first instance may be executed in a first page and instruct the user to navigate to a second page, and one or more second instances may be executed in the second page and instruct the user to fill out a form via one or more balloons, descriptive elements, or the like. In some exemplary embodiments, instances of Additive Layer 135 may be embedded within one or more domains of a page, over one or more pages within a browser session, over one or more tabs or windows of the browser, or the like. In some exemplary embodiments, at least one instance may be embedded within each page for which the Additive Layer 135 is configured.

In some exemplary embodiments, Additive Layer 135 may be associated with the same domain as Extension 137, such as a same provider of a cross-domain functionality. For example, Additive Layer 135 may belong to or be provided by a walkthrough server, e.g., Server 130, which may configure Additive Layer 135 to generate cross-domain walkthroughs using capabilities or functionalities of Extension 137 for synchronization. According to this example, Additive Layer 135 may comprise walkthrough logic that is configured to monitor user interactions and provide descriptive elements with instructions in an overlay above the page. As another example, Server 130 may comprise a walkthrough provider such as WALKME™, which may obtain or generate both the Extension 137 and the Additive Layer 135, and provide them to end devices, e.g., to be stored on local memory thereof, to communicate with the walkthrough provider, or the like. Additive Layer 135 may be configured to implement the walkthrough logic, and Extension 137 may be configured to provide cross-domain storage capabilities to Additive Layer 135 and to enable the instances of Additive Layer 135 to synchronize their storage with the storage of Extension 137.

In some exemplary embodiments, Environment 100 may comprise one or more communication iframe elements, e.g., Iframes 133, within one or more respective pages browsed by Browser 160, e.g., browsed simultaneously, sequentially, or the like. In some exemplary embodiments, an Iframe 133 embedded within a browsed page may be invisible, in order to prevent any disturbance to the UX. Alternatively, Iframe 133 may be visible, partially visible, or the like. In some exemplary embodiments, an Iframe 133 embedded within a browsed page may be an empty page, a blank page, or the like, which does not include any content. In some exemplary embodiments, Extension 137 in each Browser 160 may be able to communicate with the instances or software portions of Additive Layer 135 via the Iframes 133 in each page, e.g., in order to synchronize storage data of the instances with the memory storage of Extension 137, update the storage of an Extension 137, or the like, over all the domains of all of the browsed pages. In some exemplary embodiments, an Iframe 133 may be configured to enable instances of Additive Layer 135 and Extension 137, which are both executed by Browser 160, to synchronize data by exchanging communications, messages, event data, storage data, or the like. In some exemplary embodiments, Iframe 133 may be configured to enable instances of Additive Layer 135 to obtain data from the memory storage of Extension 137, to update the data, or the like, e.g., over multiple domains, without using browser cookies or relying on the Browser 160 for handling the data synchronization.

In some exemplary embodiments, the Extension 137 of Browser 160 may be configured to generate or create an Iframe 133, e.g., upon browsing a new page or rendering a page. In other cases, Iframe 133 may include any other medium of entity that enables to establish cross-domain communications between a storage of the Extension 137 and instances of Additive Layer 135, which enabled to monitor page events, or the like. In some exemplary embodiments, a content portion of the Extension 137, which may not have direct access to the storage of Extension 137, may be configured to generate an Iframe 133 for a page.

In some exemplary embodiments, in order for Extension 137 to create Iframe 133, Extension 137 may first verify that a domain of a page in which Iframe 133 is to be embedded is listed in a whitelist of authorized domains. In some exemplary embodiments, Extension 137 may verify that a URL of a page in which Iframe 133 will be embedded matches a defined list, e.g., a whitelist, of authorized domains, regular expressions, or the like, for which Additive Layer 135 is configured to be executed. In some exemplary embodiments, the whitelist may define domains, regular expressions, or the like, to which a cross-domain functionality of Additive Layer 135 may be defined, e.g., domains for which a walkthrough provider is configured to provide a walkthrough. In some exemplary embodiments, the security verification may be configured to ensure that the domain in which the Iframe 133 is to be embedded comprises an authorized domain, thereby ensuring that the storage of the Extension 137 is exposed only in trusted domains. In some exemplary embodiments, in response to determining that the domain of the page is listed in the whitelist of authorized domains, the extension may be configured to generate a communication iframe element within the page. In some exemplary embodiments, after the domain of Iframe 133 is verified, Iframe 133 may be loaded in a page.

In some exemplary embodiments, after Iframe 133 is loaded or injected to the page, an instance of Additive Layer 135 may be embedded and executed in the page. In some exemplary embodiments, during an initialization phase, Extension 137 may ensure that a storage configuration of the instance is configured to utilize the storage of Extension 137 via Iframe 133. In some exemplary embodiments, after the instance is configured to utilize the storage of Extension 137, a software handshake may be performed to initialize the in-memory storage of the instance. In some exemplary embodiments, Extension 137 may ensure that an Iframe 133 is set in the browsed page, load at least one instance of Additive Layer 135 over the page, and initialize the in-memory storage of the instance of Additive Layer 135 with a replica of the storage of Extension 137. In some exemplary embodiments, the in-memory storage of the instance of Additive Layer 135 may each be initialized with a cached replica of the storage of Extension 137, e.g., storing a latest version of user information, stateful data of Additive Layer 135, browsing data, account information, session information, or the like.

In some exemplary embodiments, after completing the handshake and initializing the instances, data synchronization may be enabled, e.g., enabling each instance of Additive Layer 135 to obtain and update the storage of Extension 137, and the instances of Additive Layer 135 may be activated to perform their intended functionality. In some exemplary embodiments, upon modifying the storage of Extension 137, all active instances of the same account may be modified accordingly by Extension 137 using Iframe 133, thereby synchronizing the updated data over all of the instances of Additive Layer 135. In some exemplary embodiments, a data synchronization may be performed upon a change in an in-memory storage of an instance, which may follow with a modification message from the instance to Extension 137. Extension 137 may, in response, update its own storage and notify the remaining active instances of the same account, of User 102, or the like, that the storage has changed, enabling them to update their data accordingly. In some exemplary embodiments, updated data from Extension 137 may be requested actively by each launched instance of Additive Layer 135, a portion thereof, or the like, such as using a 'GET ALL' command to perform a storage initialization. In some exemplary embodiments, the inquiring instance of Additive Layer 135 may update its in-memory storage accordingly.

In some exemplary embodiments, each instance of Additive Layer 135 may be registered to one or more real time events, for which they may be configured to perform a responsive action, to perform a calculation, or the like. In some exemplary embodiments, Iframe 133 may be configured to monitor browser events such as detected user interactions within the browsed pages of a website, walkthrough steps implemented by Additive Layer 135, or the like. In some exemplary embodiments, Iframe 133 may monitor real time events in the page, and enable Extension 137 to monitor the real time events as well, e.g., by forwarded indications of the events to the Extension 137. In some exemplary embodiments, Extension 137 may be configured to inform instances that are registered to an occurring event that the event has been detected, upon obtaining an indication from Iframe 133 that the event has been detected. In some exemplary embodiments, upon being informed, a registered instance may perform a responsive action that may or may not affect its in-memory storage. In some cases, instances may be able to monitor events in the page in which they are embedded, but they may not be able to monitor events in a different page or domain. In some exemplary embodiments, Extension 137 may be configured to inform an instance that is registered to an occurring event that the event has been detected in a domain or page to which the instance has no direct access. For example, an instance in a first page may be configured to provide to a user an instruction after the user performs a defined action in a different page or tab of Browser 160, but the instance may not have access to events that occur in the different page or tab of Browser 160. Accordingly, Extension 137 may notify the instance of the event, enabling the instance to provide the instruction in response to the defined action of the user.

In some exemplary embodiments, Iframe 133 may establish a communication channel between the Additive Layer 135 and the Extension 137, enabling instances of Additive Layer 135 in each domain to synchronize data with the Extension 137. In some exemplary embodiments, Extension 137 may provide storage data to the Additive Layer 135 via Iframe 133, and instances of the Additive Layer 135 may update or modify the storage of Extension 137 via one or more communications via Iframe 133. In some exemplary embodiments, Iframe 133 may enable the Extension 137 to obtain requests of data operations from one or more instances of the Additive Layer 135 in various domains, and inform the instances in any other domain or tab about the operation that has been performed to the storage. In some exemplary embodiments, Iframe 133 may enable active instances of the Additive Layer 135 to read or obtain data from the storage of Extension 137, to delete data of the storage, to update data records of the storage, or the like. In some exemplary embodiments, Extension 137 may maintain the storage and ensure it is synchronized along in-memory storages of instances of Additive Layer 135 that are active at different domains, pages, tabs, or windows of a session of Browser 160. In some exemplary embodiments, the Extension 137 and the instances of Additive Layer 135 may cooperate in order to keep a data consistency over multiple domains, by propagating updated data from the Extension 137 to each open instance of Additive Layer 135, by enabling any open instance of Additive Layer 135 to propagate modification requests to the Extension 137 in order to update the storage data of the Extension 137, or the like.

In some exemplary embodiments, upon obtaining a message such as a request to update or retrieve storage data, the Extension 137 may first validate an origin of the message before processing the content of the message or implementing the requested operation. In some exemplary embodiments, the Extension 137 may ensure that the message originates from Additive Layer 135, that the message originates from an active instance of Additive Layer 135, that the message originates from an instance that is associated with Server 130, that the message originates from an instance in a domain that is authorized by Server 130, or the like. In some exemplary embodiments, subsequently to validating the message's origin, the Extension 137 may dispatch the message for processing. In some exemplary embodiments, the Extension 137 may process the message content, such as to identify a requested operation that is requested to be performed with respect to the storage. In some exemplary embodiments, the Extension 137 may perform the requested operation, e.g., retrieve requested data from the storage, update one or more entries of the storage, add one or more entries to the storage, delete one or more entries from the storage, or the like. In some exemplary embodiments, a response or update message with the retrieved data may be provided to one or more instances of the Additive Layer 135, e.g., indicating updated data, deleted data, retrieved data, or the like. In some exemplary embodiments, in case of a reading operation, the response may be provided to individual inquiring instances, while for operations that modify the storage, an update may be provided to all active instances of the session.

In some exemplary embodiments, synchronizing the storage data may comprise, e.g., receiving an update request or a reading request from a first instance of the instances of the additive software layer, via Iframe 133. In some exemplary embodiments, an update request may be configured to modify an original value of a data record in the memory storage with a new value, to delete a data record, to add a data record, or the like, while a reading request may be configured to retrieve the original value of the data record without modifying the storage. In some exemplary embodiments, Extension 137 may receive the request and perform the requested operation, e.g., updating the original value of the data record with the new value. In some exemplary embodiments, after performing the requested operation, Extension 137 may or may not inform, via Iframe 133, one or more second instances of the additive software layer that the original value has been replaced with the new value, that the data record has been removed, or the like.

In some exemplary embodiments, a content portion of the Extension 137 may be configured to generate and communicate with the Iframe 133, and a different portion of the Extension 137, e.g., a background portion, may retain and handle the memory storage of Extension 137. In some exemplary embodiments, upon obtaining a request to update or obtain storage data from Extension 137, the content portion of the Extension 137 may dispatch the message to the background portion, which retains the memory storage. In case of a reading request, the background portion may retrieve the requested data, and dispatch a message with the retrieved data to the content portion. In case of a modifying request, the background portion may perform the requested modification, and dispatch a message with the amended data or indication thereof to the content portion. In some exemplary embodiments, the content portion may receive the message from the background portion and send an update message with the retrieved or amended data to one or more instances of the Additive Layer 135. In some exemplary embodiments, since the events may be asynchronous, the update message may contain the retrieved data as well as the original request, headers thereof, or the like.

In some exemplary embodiments, a reading or retrieval request may be generated by an instance of the Additive Layer 135 and may comprise an asynchronous task, requiring the instance to wait for a response from the Extension 137 before performing an associated action. For example, initialization of an instance of the Additive Layer 135 may be halted until a response message is received from the Extension 137. In some exemplary embodiments, Extension 137 may locate the requested data records within its memory storage, and generate a response message comprising the data record. In some exemplary embodiments, the response message may be configured to be provided to the requesting instance only, or to additional instances of the Additive Layer 135. In some exemplary embodiments, since reading events may be asynchronous, a response message sent from the Extension 137 to the iframe with the requested data may contain the retrieved data from the storage, in addition to request information of the reading request. For example, request information may indicate the type of request that was received by the Extension 137, an identity of the requesting instance of the Additive Layer 135, or the like.

In some exemplary embodiments, an updating request or task configured to update a data record may be triggered or invoked by an instance of the Additive Layer 135, and may request to update data of a given account or user, such as by changing a value of a data record, deleting one or more data records, or the like. In some exemplary embodiments, the updating task may be posted by an instance of the Additive Layer 135, e.g., via an HTTP post, and may comprise a synchronous or asynchronous task, which may or may not require the Additive Layer 135 to wait for an acknowledgment to be received from the Extension 137 prior to performing one or more processes. In some exemplary embodiments, in case the request is validated or verified as originating from an authorized domain and from an instance of Additive Layer 135, the Extension 137 may locate the data record within the memory storage, and update the data record according to the update request. In some cases, an acknowledgment from the Extension 137 may indicate that the task has been completed, that the task has not been completed such as due to a verification issue, an indication of updated values of the data, or the like. In some cases, an acknowledgment from the Extension 137 may not be provided, or may be provided without the Additive Layer 135 waiting therefore, enabling Additive Layer 135 to continue to perform its functionality. In some cases, the inquiring instance may continue its operation without waiting for a response from the Extension 137, and the remaining instances may be updated subsequently of the update, e.g., by the Extension 137.

For example, Additive Layer 135 may comprise a walkthrough that is configured to provide one or more first descriptive elements in response to one or more first user interactions in a set of one or more pages, and to provide one or more second descriptive elements in response to one or more second user interactions in the set of one or more pages. In some exemplary embodiments, the set of one or more pages may be defined over multiple domains including a first domain and a second domain. In some exemplary embodiments, the first user interaction may be directed at the first domain, and the second user interaction may be directed at the second domain. In some exemplary embodiments, an instance of Additive Layer 135 may be configured to obtain an indication of the first user interaction with the first domain, e.g., from Extension 137 via an Iframe 133 that is embedded in the first domain, by independently monitoring the user interaction, or the like. In some exemplary embodiments, in response to obtaining the indication, the instance may provide the first descriptive element and display it over the page. In some exemplary embodiments, the instance may update its own in-memory storage to indicate that the first user interaction and the first descriptive element have been implemented. In some exemplary embodiments, after updating the in-memory storage, prior thereto, simultaneously thereto, or the like, the instance may notify Extension 137 via Iframe 133 that the first user interaction and the first descriptive element have been implemented, e.g., providing real-time stateful data to Extension 137. In some exemplary embodiments, Extension 137 may update the remaining instances of the walkthrough of the change.

In some scenarios, the first domain may be associated with a first page of the set of one or more pages, and the instance may be embedded within the first page and provide the first descriptive element. For example, one or more elements of the first domain may be embedded within the first page. In some exemplary embodiments, the second domain may be associated with a second page of the set of one or more pages, in which a second instance of the additive software layer may be embedded. The second instance embedded within the second page may be configured to provide the second descriptive element over the second page. According to this scenario, a first communication iframe element may be embedded within the first page and a second communication iframe element may be embedded within the second page. In some exemplary embodiments, the instance may notify Extension 137 that the first user interaction and the first descriptive element have been implemented via the first communication iframe element that is embedded within the first page. In case the second user interaction is identified, and the second descriptive element is implemented by the second instance, the second instance may notify Extension 137 that the second user interaction and the second descriptive element have been implemented via the second communication iframe element that is embedded within the second page.

In some scenarios, elements associated with the first and second domains may be embedded in a single page of the set of one or more pages. In some exemplary embodiments, the instance may be embedded within the single page, and may be configured to provide the first and second descriptive elements over the page. In some exemplary embodiments, the communication iframe element may be embedded within the same page. Notifying Extension 137 may be performed via the communication iframe element of the page. In some exemplary embodiments, the instance may notify Extension 137 that the first user interaction and the first descriptive element have been implemented via the communication iframe element that is embedded within the page. In case the second user interaction and the second descriptive element are implemented by the instance, the instance may notify Extension 137 that the second user interaction and the second descriptive element have been implemented via the same communication iframe element that is embedded within the page.

In some exemplary embodiments, upon being notified that the first user interaction and the first descriptive element (or the second user interaction and the second descriptive element) have been implemented, Extension 137 may be configured to modify the memory storage to indicate that the first user interaction and the first descriptive element have been implemented, e.g., in case that a different instance is registered to such events, in case the events are determined to be recorded, or the like. In some exemplary embodiments, Extension 137 may update the instances of Additive Layer 135 with a modified version of the memory storage, which may indicate that the first user interaction and the first descriptive element have been implemented.

Figure 2:
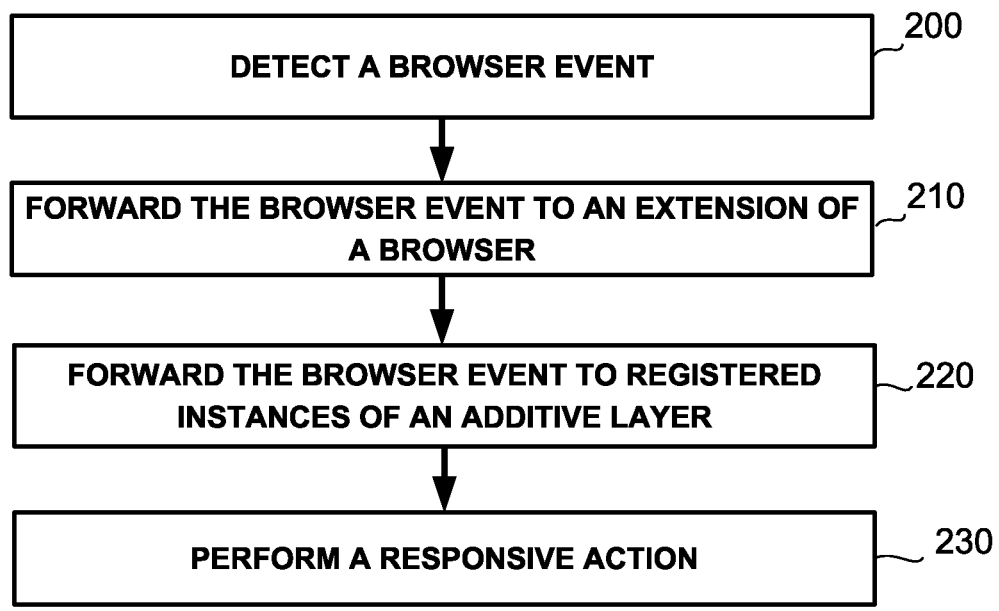
FIG. 2 illustrates a flowchart diagram of a method, in accordance with some exemplary embodiments of the disclosed subject matter.

Referring now to FIG. 2, illustrating a flowchart diagram of a method, in accordance with some exemplary embodiments of the disclosed subject matter.

On Step 200, a browser event may be monitored, detected, identified, or the like, in a first page, e.g., by a communication iframe element embedded within the page, by an instance of an additive software layer that is running within the page, by an event handler registered to the page, or the like. In some exemplary embodiments, the browser event may comprise one or more user interactions, timeouts, states, cursor movements, or the like. In some exemplary embodiments, the browser event may be part of a sequence of the user interactions that may be configured to be performed over multiple domains, e.g., in a set of one or more defined pages, tabs, embedded domain elements, or the like, of a browser. For example, the detected browser event may comprise a user interaction with the first page that can be monitored by a communication iframe element that is embedded within the first page.

On Step 210, the browser event may be forwarded or reported to an extension of a browser browsing the first page. In some exemplary embodiments, in case the communication iframe element monitored the event, an indication of the event may be provided from the communication iframe element to the browser. In some exemplary embodiments, in case an instance of the additive software layer has monitored the event, an indication of the event may be provided from the instance to the browser via the communication iframe element, e.g., after an in-memory storage of the instance has been updated accordingly. In some exemplary embodiments, communications between the extension and the communication iframe element may be performed using web API communications such as postMessage messaging or any other communication medium between the communication iframe element and the extension.

In some exemplary embodiments, the extension may be associated with a service provider that is configured to provide a cross-domain functionality such as a walkthrough. In some exemplary embodiments, the extension may function independently, using locally retained logic retained in a user device browsing the first page, without requiring communications with a server of the service provider. In some cases, the extension may utilize communications with the server to obtain content or data records from the server, update the server, or the like. In some exemplary embodiments, the service provider may be associated with an additive software layer that is configured to provide a cross-domain functionality such as a walkthrough over one or more defined pages. In some exemplary embodiments, the same service provider may be associated with both the extension and the additive software layer, e.g., both being installed from a server of the service provider, both being provided by the service provider, or the like. In some exemplary embodiments, the cross-domain functionality may be configured to be generated over the a set of defined pages, e.g., the first page and/or one or more additional webpages, one or more additional tabs of the browser window, one or more additional browser instances, or the like.

On Step 220, the extension may forward indications of the browser event to registered instances, via the communication iframe element. In some exemplary embodiments, the extension may determine whether or not one or more instances of the additive software layer are registered to the browser event, whether the browser event is relevant for one or more instances of the additive software layer, or the like. In some exemplary embodiments, instances that are registered to the event may be embedded in a different page, tab, or domain, other than the first page, and may not have direct access to the event. In some exemplary embodiments, in case one or more instances of the additive software layer are registered to the browser event, the extension may update the one or more instances of the event using an update message. For example, in case an instance of a walkthrough that is embedded in a second page is registered on an event of clicking on an 'ok' button in the first page, and the browser event comprises a user clicking on an 'ok' button in the first page, the extension may forward information regarding the event to the instance that is embedded in the second page, enabling the instance to trigger a responsive action such as invoking a walkthrough step in response to the browser event, adjusting a calculation, or the like.

In some exemplary embodiments, in case the extension determines that the browser event is registered by one or more instances of an additive software layer, indications of the event may or may not be added to the storage of the extension, e.g., in a new data entry or record of the user account that is associated with the browser session, in an existing data entry, by deleting a data entry that is determined to be inaccurate in view of the event, or the like. In such a case, active instances of the browser session may be informed of the modifications to the storage.

In some exemplary embodiments, the extension may generate an updating message indicating the browser event to the one or more instances of the additive software layer that are launched in one or more pages, and send the message to respective communication iframe elements of the pages. In some exemplary embodiments, the communication iframe elements may forward the message to the instances of the additive software layer, thereby enabling the instances of the additive software layer to indirectly monitor the browser events of the first page, even in case they are executing over a different page, over a different tab of the browser, over a different instance of the browser, or the like. In some exemplary embodiments, the message may be addressed to all of the instances of the additive software layer, active instances thereof, a portion of the active instances, only registered instances of the additive software layer, or the like.

On Step 230, at least one registered instance of the additive software layer may obtain the report about the browser event from the communication iframe element, and perform one or more responsive actions in response to the browser event, which may or may not affect the in-memory storage of the instance. For example, in case of a walkthrough, the walkthrough layer may generate and display one or more instructions as an overlay above the first page or over a different page, e.g., indicating that the user should perform an interaction with the first page in a same of different domain as the browser event, indicating that the user should perform an interaction in a second page, indicating that the user should perform an interaction in a different tab of the browser, or the like. As another example, the walkthrough layer may add one or more instructions as an overlay above a second page different from the first page. The second page may comprise an embedded page within the first page, a separate webpage in a different tab of the browser, a separate page in a different instance of the browser, or the like. For example, upon identifying that a user closed a first tab in the browser, a walkthrough instance in a second tab that is still active may instruct the user to close the second tab.

In some exemplary embodiments, the responding instance may or may not update its in-memory storage with the event and/or the responsive action. In some cases, the performed action may require a reading action, causing the instance to read and utilize one or more storage entries in its in-memory storage, and possibly to update its in-memory storage that a reading action has been implemented. In some cases, the performed action may require a writing action, causing the instance to insert or amend one or more storage entries in its in-memory storage, e.g., indicating that the performed action has been performed. In some cases, the implementing instance may update its in-memory storage and then notify the extension of the update, e.g., similarly to the process of FIG. 3. In some cases, the instance may not update its in-memory storage regarding the implemented action, e.g., in case the action is determined to be irrelevant to other instances, in case a communication iframe element in the domain of the instance is configured to detect and report the responsive action, or the like.

In some exemplary embodiments, any one of Steps 200-230 may be performed iteratively for every detected event, for defined types of events, for each event of a defined sequence of one or more browser events, or the like.

Figure 3:
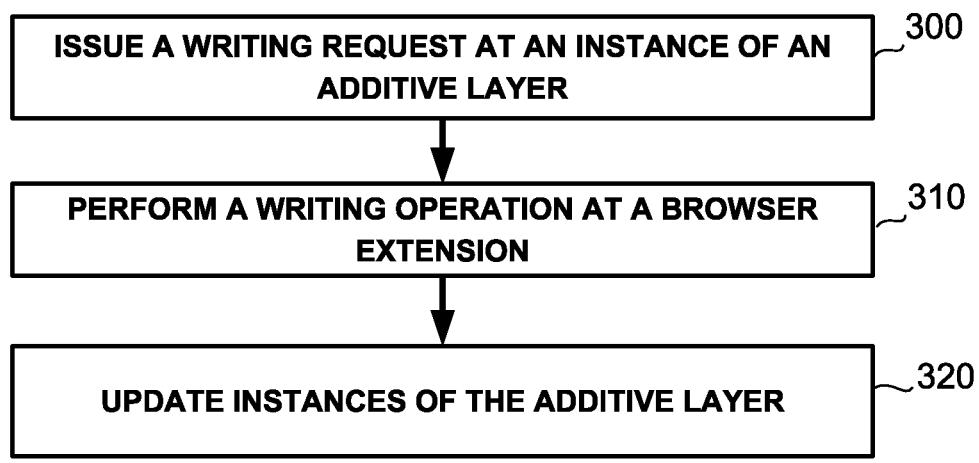
FIG. 3 illustrates a flowchart diagram of a method, in accordance with some exemplary embodiments of the disclosed subject matter.

Referring now to FIG. 3, illustrating a flowchart diagram of a method, in accordance with some exemplary embodiments of the disclosed subject matter.

In some exemplary embodiments, an extension for a browser and an additive software layer such as a walkthrough may exchange one or more message interactions via a communication iframe element, e.g., an invisible communication iframe element. In some exemplary embodiments, the messages may facilitate the synchronization of data regarding operations such as create, read, update, and delete (CRUD) operations, between the storage of the extension and the in-memory storages of the instances of the additive software layer. In some exemplary embodiments, a protocol or instruction file may define communication packets or communication protocols to facilitate communications between the instances and the extension, such as by providing a list of enabled operations according to the protocol to the instances, to the extension, or the like. In some exemplary embodiments, the communication iframe element may enable the in-memory storage of the additive software layer instances to be initialized with an updated version of the storage of the extension, e.g., upon launching each instance. In some exemplary embodiments, in case an instance updated its in-memory storage, the instance may synchronize the storage with the storage of the extension using one or more writing requests, e.g., according to Steps 300-320.

On Step 300, an instance of the additive software layer may issue a writing request or message (also referred to as "modification message"). In some exemplary embodiments, a writing request may be invoked upon changing the in-memory storage of the instance, e.g., in response to a monitored or performed action at the instance. In some exemplary embodiments, a writing action (e.g., using a command such as 'persist' or 'save') may be used to update the extension, e.g., using an adapted push mechanism. In some exemplary embodiments, the writing request may be issued in order to modify or update storage data of the extension, e.g., after an in-memory storage of the instance has been updated, or at any other time such as without modifying an in-memory storage of the instance. In some exemplary embodiments, the additive software layer may generate the writing request and post or provide the writing request to the communication iframe element, e.g., using an HTTP post medium or any other communication medium or protocol, which in turn may forward the message to the extension.

In some exemplary embodiments, the writing request may be issued by any active instance of the additive software layer in any domain, tab, or window of a browsed page, in which a communication iframe element is embedded. In some exemplary embodiments, the writing request may be issued in order to update the extension's storage to reflect a new situation, to fill in missing data, to synchronize its data with the in-memory storage of the instance, or the like, which may be useful for one or more instances in a different page, domain, tab, or the like. For example, the instance may comprise walkthrough logic that may attempt to update the storage of the extension with one or more updates, e.g., indicating that a step of the walkthrough has been executed, an updated state, a completed task, a user action, or the like, which may trigger a responsive action at an instance of the walkthrough in a different domain.

In some exemplary embodiments, the writing message may comprise an identifier (ID) of an action that is to be performed, which may comprise in this case a writing action. In some exemplary embodiments, the ID of the writing operation may be indicated in the writing request by one or more strings, values, bits, or the like, e.g., by the string 'PERSIST' or any other string. In some exemplary embodiments, the writing request may comprise one or more synchronization Globally Unique Identifiers (GUIDs) in one or more fields that are configured for synchronization purposes. In some exemplary embodiments, the one or more synchronization GUIDs may be generated automatically and may be utilized to globally identify communication packages. In some exemplary embodiments, the writing request may comprise one or more account GUIDs configured to identify an account or a user. In some exemplary embodiments, the writing request may comprise a storage key, a new value for the storage that is associated with the key, an expiration date of the new value such as in a form of a Time To Die (TTD), or the like.

In some exemplary embodiments, the extension may maintain the storage by performing maintenance action periodically, upon request, independently, or the like. In some exemplary embodiments, the background portion of the extension may be configured to maintain the storage. In some exemplary embodiments, the extension may independently perform maintenance operations on the storage based on one or more properties such as a TTD property, or any other expiration date indicating how much time is left for each information entry. In some exemplary embodiments, the storage may be used to retain one or more properties of stored data, such as a TTD property of a stored user interaction, a TTD property of a walkthrough step, a TTD property of a state, or the like. In some exemplary embodiments, a TTD may be added to a writing request by an instance of the additive software layer, by the communication iframe element, or the like. Alternatively, the extension itself may be configured to add a TTD property to a retained data entry. In some exemplary embodiments, a data entry retained in the storage during a detected event, may be retained together with a TTD, and the data entry may be matched against the date of the TTD, marking whether the data is valid, whether the data should be deprecated, or the like. In some exemplary embodiments, the extension may independently examine the validness of data entries according to their TTD property, such as during a separate batch process. In some exemplary embodiments, the extension may examine the TTD or expiration date of each data entry and determine whether or not the data is expired. In some exemplary embodiments, in case the expiration date or TTD has passed, this may indicate that the data is expired, the extension may proceed with the deletion of the expired data. In some exemplary embodiments, in order to maintain consistency, upon deletion, an update message may be issued to update the instances of the additive software layer, indicating that the outdated value has been deleted from the extension's storage, e.g., in accordance to FIG. 5. In some exemplary embodiments, the extension may maintain the storage by performing any other operation.

On Step 310, the extension may obtain or receive the writing request from the additive software layer via the communication iframe element, and verify the message. In some exemplary embodiments, upon identifying that the message is verified, the extension may implement the writing operation. In some exemplary embodiments, depending on the type of the request, a different implementation may take place. In some exemplary embodiments, in response to receiving the writing message, the extension may determine that the message is configured to update a data record of the memory storage with a new value, locate the data record within the memory storage, and update the data record with the new value. In some exemplary embodiments, in response to receiving the writing message, the extension may determine that the message is configured to add a new data record with a new value to the memory storage, and add the data record to the memory storage. For example, a writing request may be implemented by writing a new value in an existing entry or a new entry. In some exemplary embodiments, the extension may update the indicated data value that is indicated by the storage key of the writing request, with a value indicated by the writing request, e.g., in an entry of the extension storage. For example, the writing request may indicate a storage key of a first entry and a new value for the first entry, and the extension may update the first entry of the storage key with the new value.

In some exemplary embodiments, upon obtaining a writing request at a content portion of the extension, the content portion may identify that a 'PERSIST' event has occurred, process the event, and send an indication of the event to the background portion of the extension. In some exemplary embodiments, the background portion, which has access to the memory storage, may write the requested data indicated by the PERSIST' request in the memory storage, e.g., in a new entry, in an existing entry, or the like. In some exemplary embodiments, the background portion may generate and send a message such as a response message with an indication of the written data and the request specifications to the content portion. In some exemplary embodiments, the background portion may indicate the written data and the request specifications to the content portion, and the content portion may generate and send the response message to the instances. In some exemplary embodiments, the content portion may send the message that it received from the background portion via the communication channel to the instances of the additive software layer.

On Step 320, the extension may update instances of the additive software layer about the updated extension storage, e.g., via an informing message, an update message, or the like. In some exemplary embodiments, the extension may generate an informing message comprising the new data record or the amended data record with the new value. In some exemplary embodiments, the update message may indicate that a new entry has been added with a new value, that an existing entry has been assigned a new value, that multiple values have been added, removed, changed, or the like. In some exemplary embodiments, the updated version of the memory storage may be indicated to the additive software layer by providing the informing message to the instances of the additive software layer, to a portion thereof, or the like. In some exemplary embodiments, the extension may provide the update message to every active instance of the additive software layer that may be running in the browser session, so that all of the running instances retain data that is up to date. In some exemplary embodiments, the extension may provide the update message to at least a portion of the instances of the additive software layer including at least one instance that is different from the inquiring instance that initiated the update.

In some exemplary embodiments, the extension may perform a role of a coordination agent that synchronizes the storage of the extension with the in-memory storages of instances of the additive software layer. In some exemplary embodiments, the extension may send an update message with the updated information to active instances in any page that is loading with the same account or user, e.g., within the same browser session. In some exemplary embodiments, the update message may be generated by the extension to include the identifier of the performed action, e.g., 'PERSIST'. In some exemplary embodiments, including the identifier of the performed action may enable to synchronize and keep track of messages and operations.

In some exemplary embodiments, the extension may or may not trigger one or more post processes, e.g., via an HTTP post, such as sending a confirmation message to an inquiring instance that triggered the writing request, indicating that the data has been updated successfully or that an error was encountered preventing the operation. In some exemplary embodiments, the confirmation message may be sent to the additive software layer via the communication iframe element.

In some exemplary embodiments, instances of the additive software layer may monitor communications, ports, or the like, to obtain the update message from the extension via the communication iframe element. In some exemplary embodiments, as the instances of the additive software layer may monitor communications and events of the communication iframe element, they may obtain the update message and update their in-memory storage accordingly, e.g., by updating the data entry indicated by the storage key with the new value, adding the new entry, or the like, thereby ensuring that the data of the in-memory storages of all the instances are synchronized once more with each other and with the extension. In some exemplary embodiments, any impact on data stored in the extension may be propagated automatically to the in-memory storage of each active instance or portion thereof, e.g., registered instances.

In some exemplary embodiments, performing Steps 300-320 may provide an enhanced pushing mechanism enabling to synchronize new data that originated from an active instance of the additive software layer, with the storage of the extension and then with the entire set of active instances of the additive software layer. In some exemplary embodiments, this mechanism may ensure that all of the running instances of the additive software layer have an updated and synchronized version of the extension's storage with the latest most accurate data, which may be of vital importance for providing cross domain functionality. In some exemplary embodiments, by ensuring that the instances of the additive cross domain layer retain synchronized in-memory storages with up-to-date data, the instances may be able to determine which instance should continue with a flow of a walkthrough, which functionality should be implemented, or the like.

Figure 4:
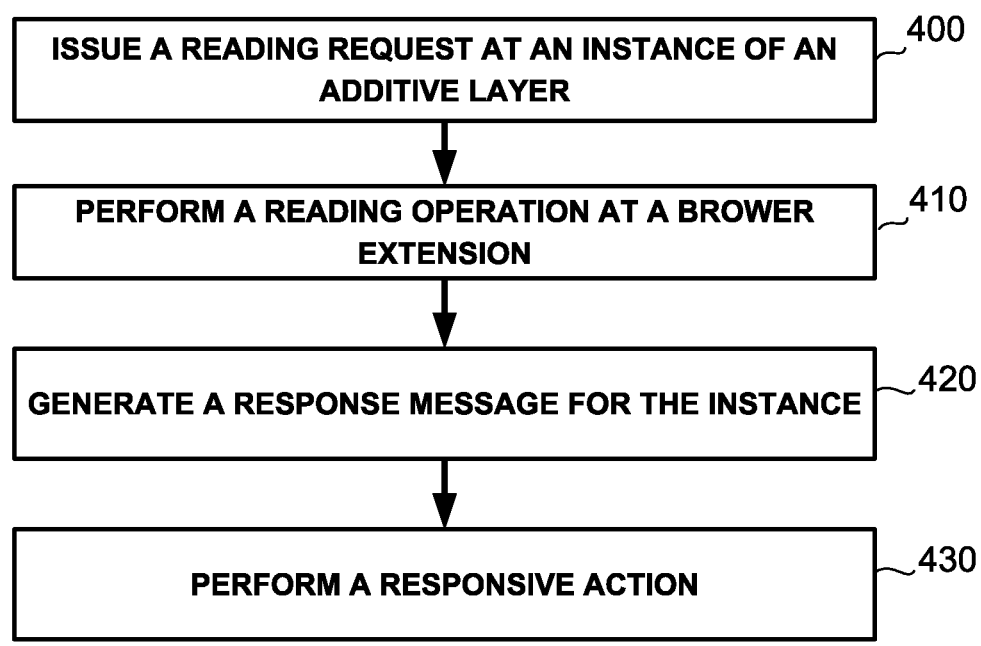
FIG. 4 illustrates a flowchart diagram of a method, in accordance with some exemplary embodiments of the disclosed subject matter.

Referring now to FIG. 4, illustrating a flowchart diagram of a method, in accordance with some exemplary embodiments of the disclosed subject matter.

On Step 400, an instance of the additive software layer may issue a reading request or message (also referred to as a "retrieval message"). In some exemplary embodiments, after the handshake initialization, during which the in-memory storage of the instance may be loaded with a replica of the storage of the extension, the instance may be enabled to read data that is stored in the in-memory storage and utilize it for any purpose. In some exemplary embodiments, an instance may initiate a memory synchronization with the extension such as by generating a reading request and sending the request to the extension. In some exemplary embodiments, the reading request may be configured to obtain retrieved data from the extension's memory storage, e.g., in order to initialize the in-memory storage of the instance during the handshake or for any other purpose or scenario. In some exemplary embodiments, the additive software layer may generate the reading request and send the reading request to the communication iframe element, which in turn may forward the reading request to the extension. In some exemplary embodiments, a reading request may utilize a command such as 'GET' or 'GET ALL' to obtain retrieved data from the storage of the extension.

In some exemplary embodiments, the reading request may be issued by any active instance of the additive software layer in any domain, tab, or window of a browsed page in order to retrieve data from the extension's storage. In some exemplary embodiments, data at the extension's storage may be queried at any point in time, at any point of a flow of interactions such as of a walkthrough, or the like. For example, the additive software layer may comprise walkthrough logic that may attempt to read data from the storage of the extension in order to determine which step of the walkthrough has been executed in a different domain. As another example, the reading request may be issued for a newly launched instance, in order to initialize the in-memory storage of the instance with a current version of the extension's storage. As another example, the reading request may be issued in case previous update communications of the extension were delayed.

In some exemplary embodiments, the reading request may comprise an identifier such as a GUID of an action that is to be performed, which may comprise a reading action. In some exemplary embodiments, the ID of the reading operation may be indicated in the reading request by one or more strings, values, bits, or the like, e.g., by the strings 'GET' or 'GET ALL'. In some exemplary embodiments, the reading request may comprise one or more synchronization GUIDs in one or more fields that are configured for synchronization purposes. In some exemplary embodiments, the one or more synchronization GUIDs may be generated automatically and may be utilized to globally identify communication packages. In some exemplary embodiments, the reading request may comprise one or more account GUIDs configured to identify an account or a user. In some exemplary embodiments, the reading request may comprise a storage key of the requested data.

In some exemplary embodiments, the commands 'GET' or 'GET ALL' may be different in one or more ways. For example, the 'GET' operation may request a single record or data unit that may be identified by the storage key, while the 'GET ALL' operation may request an entire record of keys and/or data of a given account or user. In some exemplary embodiments, in case of the 'GET ALL' operation, the reading request may exclude the storage key, e.g., as it may become redundant.

On Step 410, the extension may obtain the reading request or event from the additive software layer via the communication iframe element, and verify the request. In some exemplary embodiments, in response to receiving the reading request from the communication iframe element, the extension may implement the reading operation by determining that the indicated data of the retrieval message corresponds to a data record of the memory storage, locating the data record within the memory storage, and generating a response message to comprise the data record. In some exemplary embodiments, the extension may retrieve the requested data from the extension storage, e.g., as indicated by the reading request. In some exemplary embodiments, in case of a 'GET ALL' request, the extension may retrieve an entire data record or table of a user account, while in case of a 'GET' request, the extension may retrieve a defined entry or entries of a user as indicated by the storage key. For example, for a 'GET ALL' request, the extension may retrieve an entire data record of a user's walkthrough, indicating all the user interactions and monitored states of the walkthrough.

In some exemplary embodiments, upon obtaining a reading request at a content portion of the extension, the content portion may identify that a 'GET' or 'GET ALL' event has occurred, process the event, and send an indication of the event to the background portion of the extension. In some exemplary embodiments, the background portion, which has access to the memory storage, may retrieve the requested data that is being requested by the reading request from the memory storage.

On Step 420, the extension may generate a response message, an update message, or the like, with the retrieved data that was requested by the reading request, the request specifications of the reading request, or the like. In some exemplary embodiments, the response message may be sent to the communication iframe element, which may forward the response message that it received to the inquiring instance, e.g., the instance that generated the reading request, or to any other instance. In some exemplary embodiments, the response message may be generated by the extension to include the identifier of the performed action, e.g., 'GET'. In some exemplary embodiments, adding the identifier of the performed action may enable to synchronize and keep track of messages and operations, and may be performed for all response or update messages that are intended to update the instances with up-to-date data.

In some exemplary embodiments, the background portion may generate and send the update message with the retrieved data and the request specifications to the content portion, or indicate the retrieved data to the background portion in any other manner. In some exemplary embodiments, the content portion may send the message that it received from the background portion via the communication channel to the instances of the additive software layer. In some exemplary embodiments, the content portion may obtain an indication of the retrieved data and generate the update message.

On Step 430, the response message may be utilized by the instance of the additive software layer for one or more purposes. In some exemplary embodiments, the instance may retain the received data in its in-memory storage. In some exemplary embodiments, the inquiring instance may carry out a responsive action that is configured to be performed by utilizing the requested data within the in-memory storage. In some exemplary embodiments, in both the 'GET' and 'GET ALL' request types, the actions may be executed asynchronously one after another, requiring the instance to wait for a response from the extension.

Figure 5:
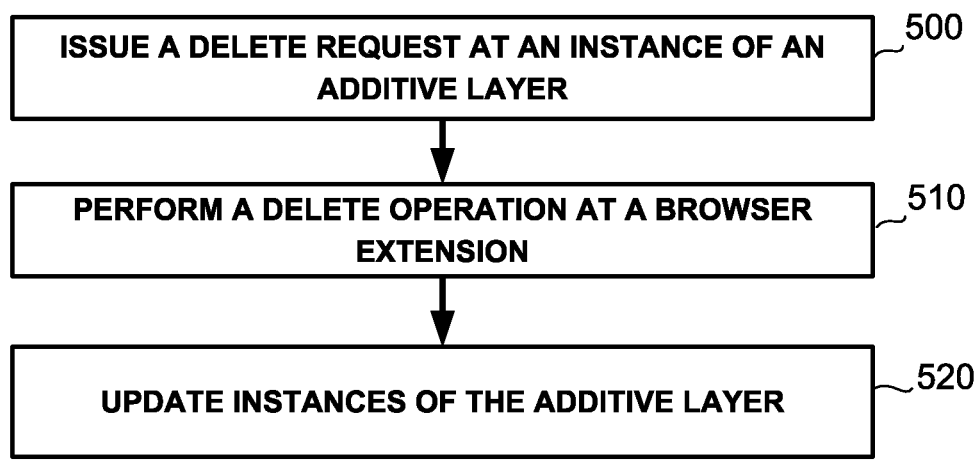
FIG. 5 illustrates a flowchart diagram of a method, in accordance with some exemplary embodiments of the disclosed subject matter.

Referring now to FIG. 5 illustrating a flowchart diagram of a method, in accordance with some exemplary embodiments of the disclosed subject matter.

On Step 500, an instance of the additive software layer may issue a remove request or message, indicating that some content of the extension's storage should be removed. In some exemplary embodiments, the remove request may follow a delete operation that may be performed within the in-memory storage of the instance. In some exemplary embodiments, in the case of data deletion, the extension may synchronize its storage by deleting one or more data entries that were deleted in the in-memory storage of the instance. In some exemplary embodiments, the remove request may be configured to delete or remove one or more entries or records of a user account or session, e.g., all of the existing entries of a user, an account, a session, an additive layer operation, a portion thereof, or the like. In some exemplary embodiments, the instance may generate the remove request and post or provide the remove request to the communication iframe element, e.g., via an HTTP post, which in turn may forward the remove request to the extension.

In some exemplary embodiments, after completing the handshake between the additive software layer and the extension, and successfully loading the in-memory of the instance, e.g., the walkthrough instance, with the updated version of the storage of the extension, deletion of data that is stored in the in-memory storage of the extension may be enabled. In some exemplary embodiments, a deletion action may be invoked or triggered in case the instance has determined that the data is not up to date, that the data has no value in a current state, that the data is invalid in view of a new situation, that the data has no value for any instance, or the like. In some exemplary embodiments, after modifying the in-memory storage, or in any other time, the instance may report the change to the extension such as via a delete or deletion message. In some exemplary embodiments, a deletion message may be used to delete data from the storage of the extension using a command such as 'REMOVE', 'CLEAR', or any other command.

In some exemplary embodiments, the remove request may be issued by any active instance of the additive software layer in any tab or window of a browsed page in which a communication iframe element is embedded. In some exemplary embodiments, data at the extension's storage may be requested to be deleted at any point in time, at any point of a flow of interactions such as of a walkthrough, or the like. For example, the instance of the additive software layer may comprise walkthrough logic that may attempt to delete data from the storage in case that the data is outdated, relates to a previous step of the walkthrough, relates to a previous state of the walkthrough, has timed out, or the like.

In some exemplary embodiments, the remove request may comprise an identifier such as a GUID of an action that is to be performed, which may comprise a delete action. In some exemplary embodiments, the ID of the delete operation may be indicated in the remove request by one or more strings, values, bits, or the like, e.g., by the strings 'REMOVE' or 'CLEAR'. In some exemplary embodiments, the remove request may comprise one or more synchronization GUIDs in one or more fields that are configured for synchronization purposes. In some exemplary embodiments, the one or more synchronization GUIDs may be generated automatically and may be utilized to globally identify communication packages. In some exemplary embodiments, the remove request may comprise one or more account GUIDs configured to identify an account or a user. In some exemplary embodiments, the remove request may comprise a storage key of the data that is requested to be deleted, e.g., the location of the data in the storage, the key to the requested data, or the like, e.g., in case of a 'REMOVE' command.

In some exemplary embodiments, in the case of a 'REMOVE' command, the remove request may be configured to remove a single entry, while in the case of a 'CLEAR' command, the remove request may be configured to clear an entire table or data record of a user, of an account, of a browser session, or the like. In some exemplary embodiments, a CLEAR command may have a similar or identical effect as the browser action "Clear Cache and Cookies". In some exemplary embodiments, in contrast to the 'REMOVE' command, which may target a specific storage key from which data from the extension's storage may be removed, the 'CLEAR' command may remove all of the data. Accordingly, the storage key field may be excluded from the remove request in case of the 'CLEAR' command, as it may become redundant.

On Step 510, the extension may obtain the remove request or message from the additive software layer via the communication iframe element, verify the request, and implement the requested delete operation. In some exemplary embodiments, the delete message may comprise a type of modification message similar to the message of FIG. 3, or an independent message that is unrelated thereto. In some exemplary embodiments, the extension may attempt to delete the requested data from the extension storage, e.g., as indicated by the remove request. In some exemplary embodiments, in response to receiving the delete message, the extension may be configured to determine that the delete message is configured to delete a data record of the memory storage, locate the data record within the memory storage, and delete the data record. In some exemplary embodiments, in case of a 'REMOVE' request, the extension may delete a single data record or unit, while in case of a 'CLEAR' command, the extension may delete an entire data record or table of a user, e.g., an entire walkthrough history of a currently executing walkthrough with which a user is interacting.

In some exemplary embodiments, upon obtaining a remove request at a content portion of the extension, the content portion may identify that a 'REMOVE' or 'CLEAR' event has occurred, process the event, and send an indication of the event to the background portion of the extension. In some exemplary embodiments, the background portion, which has access to the memory storage, may remove or clear the indicated data that is indicated by the remove request, from the memory storage. In some exemplary embodiments, the background portion may generate and send a message such as a response message with an indication of the deleted data and the request specifications to the content portion. In some exemplary embodiments, request specifications may comprise one or more properties of the request such as an identity of a requesting instance, a domain of the requesting instance, timing of the request, a type of the request, or the like. In some exemplary embodiments, the content portion may send the message that it received from the background portion via the communication channel to the instances of the additive software layer.

On Step 520, once the extension has eliminated from its storage the requested data, e.g., a value of a given key, an entire session, or the like, the extension may update instances of the additive software layer with the change via an updating message, an informing message, or the like. In some exemplary embodiments, the extension may generate an informing message comprising an indication of the data record that was deleted. In some exemplary embodiments, indicating the updated version of the memory storage may comprise providing the informing message to the instances of the additive software layer. In some exemplary embodiments, the extension may issue an update message for every active instance of the additive software layer that may be running in the browser, in the user session, for every instance that is associated with the user account, a portion thereof, or the like, e.g., of a same user account that issued the remove request, for different user accounts, or the like.

In some exemplary embodiments, instances of the additive software layer may monitor communications, ports, or the like, to obtain the update message from the extension via the communication iframe element. In some exemplary embodiments, as the instances of the additive software layer may monitor communications and events of the communication iframe element, they may all obtain the updating message and update their in-memory storage accordingly, e.g., by deleting the data indicated by the storage key, thereby ensuring that the data of the in-memory storages of all the instances are synched once more with each other and with the extension. In some exemplary embodiments, any impact on data stored in the extension may be propagated automatically to the in-memory storage of each active instance.

Figure 6:
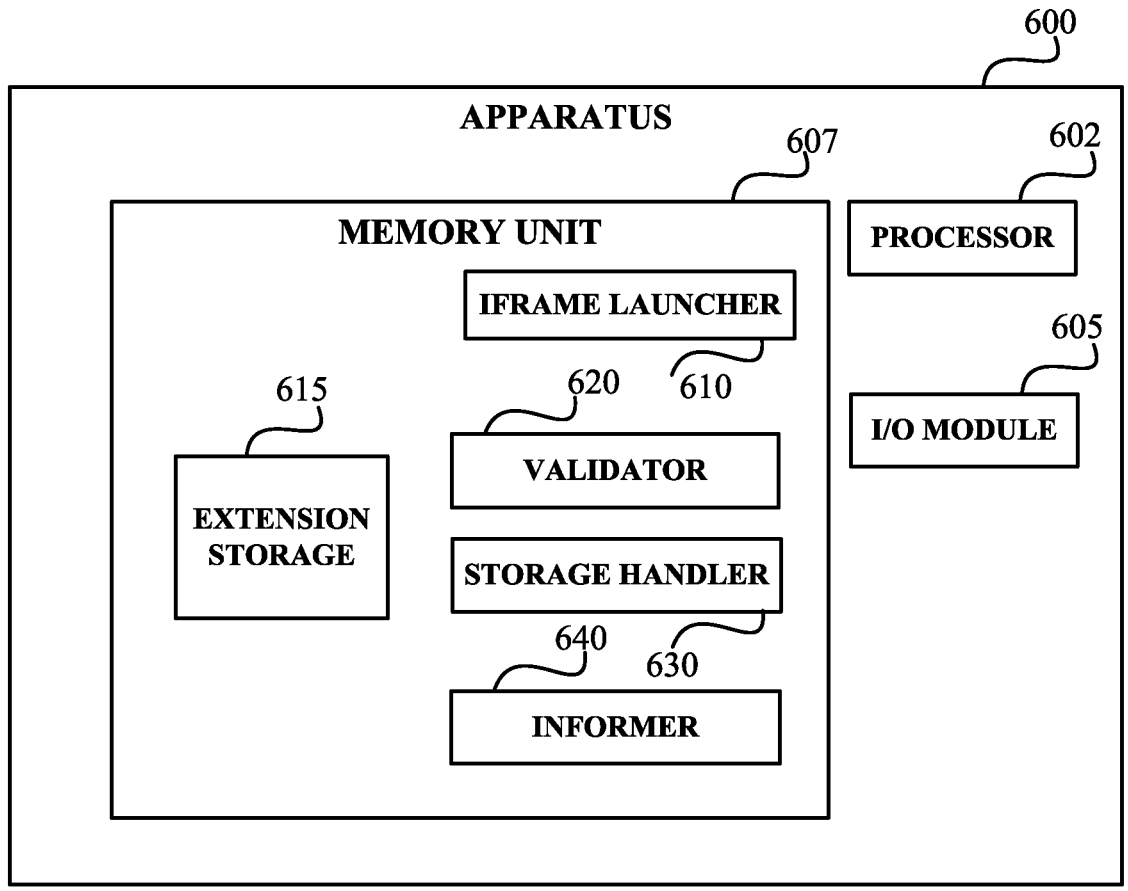
FIG. 6 illustrates a block diagram of an apparatus, in accordance with some exemplary embodiments of the disclosed subject matter.

Referring now to FIG. 6 showing a block diagram of an apparatus, in accordance with some exemplary embodiments of the disclosed subject matter.

In some exemplary embodiments, Apparatus 600 may comprise a Processor 602. Processor 602 may be a Central Processing Unit (CPU), a microprocessor, an electronic circuit, an Integrated Circuit (IC) or the like. Processor 602 may be utilized to perform computations required by Apparatus 600 or any of its subcomponents. Processor 602 may be configured to execute computer-programs useful in performing the methods of FIGS. 2-5, or the like.

In some exemplary embodiments of the disclosed subject matter, an Input/Output (I/O) Module 605 may be utilized to provide an output to and receive input from a user such as via user interactions. I/O Module 605 may be used to transmit and receive information to and from the user or any other apparatus, e.g., one or more servers such as walkthrough servers, which may be in communication therewith.

In some exemplary embodiments, Apparatus 600 may comprise a Memory Unit 607. Memory Unit 607 may be a short-term storage device or long-term storage device. Memory Unit 607 may be a persistent storage or volatile storage. Memory Unit 607 may be a disk drive, a Flash disk, a Random Access Memory (RAM), a memory chip, or the like. In some exemplary embodiments, Memory Unit 607 may retain program code operative to cause Processor 602 to perform acts associated with any of the subcomponents of Apparatus 600. In some exemplary embodiments, Memory Unit 607 may retain program code operative to cause Processor 602 to perform acts associated with any of the steps in FIGS. 2-5, or the like.

In some exemplary embodiments, Memory Unit 607 may comprise an Extension Storage 615. In some exemplary embodiments, Extension Storage 615 may comprise a memory storage that is external to the client-side execution engine of a browser. In some exemplary embodiments, Extension Storage 615 may be associated with or belong to a browser extension (not illustrated), enabling the browser extension to control, handle, update or process the data storage of Extension Storage 615. Extension Storage 615 may be retained within a browser extension, or externally thereto by providing the browser extension access thereto. Extension Storage 615 may be retained externally to a client-side execution engine of a browser, which is executing the browser extension. In some exemplary embodiments, Extension Storage 615 may retain data entry or records indicating user interactions, stateful data, browser event data, task states, session data, or the like. In some exemplary embodiments, Extension Storage 615 may retain data records for one or more browser sessions, user accounts, or the like.

The components detailed below may be implemented as one or more sets of interrelated computer instructions, executed for example by Processor 602 or by another processor. The components may be arranged as one or more executable files, dynamic libraries, static libraries, methods, functions, services, or the like, programmed in any programming language and under any computing environment.

In some exemplary embodiments, Iframe Launcher 610 may be configured to generate or launch one or more communication iframe elements (not illustrated) in one or more pages, tabs, or the like, of a browser session. Iframe Launcher 610 may interact with a browser, and place the communication iframe elements within the browsed pages. Alternatively, the communication iframe elements may already be embedded within the browsed pages. For example, a respective communication iframe element may be placed in each page that is being browsed in the browser. As another example, a respective communication iframe element may be placed in each page that is being browsed in the browser and is determined for execution of an additive software layer such as a walkthrough (not illustrated). The web browser may browse one or more pages in one or more browser windows, tabs, or the like. In some exemplary embodiments, an inserted communication iframe element may be utilized to establish a communication channel between a browser extension and the additive software layer, in order to monitor events in the page, synchronize data between Extension Storage 615 and in-memory storages of the additive software layer, or the like.

In some exemplary embodiments, Communication Validator 620 may be configured to validate each communication that is processed or obtained at the extension. Communication Validator 620 may verify that each received message originated from an instance of an additive software layer, that each received message originated from an authorized domain, from a communication iframe element that is embedded in an authorized page or domain, or the like.

In some exemplary embodiments, Storage Handler 630 may be configured to handle the storage of the extension, e.g., Extension Storage 615, similarly to handling browser cookies, and to ensure that in-memory storages of additive layer instances are synchronized with each other and with Extension Storage 615. In some exemplary embodiments, Storage Handler 630 may be configured to initialize in-memory storages of additive layer instances with Extension Storage 615, such as during a handshake phase when a communication iframe element is created, configured, verified, or the like, when an instance of the additive software layer is executed or injected to the page, or the like. In some exemplary embodiments, after initializing in-memory storages of additive layer instances, or during the initialization, Storage Handler 630 may be configured to obtain messages via the communication iframe element from the instances such as reading requests, and in case they are validated by Communication Validator 620, locate the requested data within Extension Storage 615, and provide the data to the inquiring instance via the communication iframe element. In some exemplary embodiments, after initializing in-memory storages of additive layer instances, Storage Handler 630 may be configured to obtain messages via the communication iframe element from the instances such as updating requests, and in case they are validated by Communication Validator 620, to perform a requested operation on Extension Storage 615 such as updating one or more data records in Extension Storage 615, deleting one or more data records in the Extension Storage 615, or the like. In some exemplary embodiments, in case Storage Handler 630 has modified data of Extension Storage 615 in any way, Storage Handler 630 may forward the modified data to Informer 640.

In some exemplary embodiments, Informer 640 may be configured to generate update or informing messages to active instances of the additive software layer, e.g., active instances of the user, of an account, or a browser session, or the like. In some exemplary embodiments, Informer 640 may inform the instances about any change in Extension Storage 615, so that the storage data is synchronized over all of the instances in multiple domains.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
   an extension to a browser, wherein the browser is configured to render pages, wherein the browser comprises a client-side execution engine configured to execute code embedded in the pages, wherein the browser is configured to execute the extension, wherein the extension is a computer program product that has a memory storage that is external to the client-side execution engine of the browser; and
   a communication element that is configured to enable a first instance of an additive software layer to communicate data to and from the extension, wherein the communication element is embedded within a page of a set of one or more pages, wherein the first instance of the additive software layer is embedded within the page, wherein the set of one or more pages is defined over multiple domains, wherein the set of one or more pages comprises respective instances of the additive software layer, wherein the additive software layer is configured to execute a walkthrough over the multiple domains, wherein the first instance of the additive software layer is configured to retrieve data from the memory storage of the extension by sending a retrieval message from the first instance to the communication element, wherein the communication element is configured to send the retrieval message to the extension, wherein the extension is configured to retrieve indicated data from the memory storage in response to receiving the retrieval message and to provide a response message to the first instance of the additive software layer via the communication element, wherein the first instance of the additive software layer is configured to delete data in the memory storage of the extension by sending a delete message from the first instance to the communication element, wherein the communication element is configured to send the delete message to the extension, wherein the extension is configured to delete data in the memory storage in response to receiving the delete message, wherein the extension is configured to, in response to receiving the delete message:
  determine that the delete message is configured to delete a data record of the memory storage;
  locate the data record within the memory storage;
  delete the data record;
  generate an update message comprising an indication of the data record that was deleted; and
  provide the update message to a second instance of the additive software later, wherein the respective instances of the additive software layer comprise the second instance, and wherein the apparatus comprising a processor that is configured to execute, at least, the browser.

2. The apparatus of claim 1, wherein the extension is configured to generate the communication element and embed the communication element within the page.

3. The apparatus of claim 2, wherein the extension is configured to verify that a domain of the page in which the communication element is to be embedded is listed in a whitelist of authorized domains, wherein the extension is configured to generate the communication element in response to a verification that the domain of the page is listed in the whitelist of authorized domains.

4. The apparatus of claim 1, wherein the system is configured to synchronize data of in-memory storages of the respective instances of the additive software layer with the memory storage of the extension.

5. The apparatus of claim 1, wherein the extension is configured to indicate an updated version of the memory storage to the second instance of the additive software layer, wherein the second instance is embedded within a second page other than the page.

6. The apparatus of claim 1, wherein the communication element is absent of a graphical representation, whereby the browser does not display a graphical representation of the communication element in the pages that are rendered by the browser.

7. The apparatus of claim 1, wherein the communication element is configured not to retain any data that is to be transferred cross-domains.

8. The apparatus of claim 1, wherein the extension is configured to verify that communications obtained from the communication element originate from the additive software layer.

9. The apparatus of claim 1, wherein the additive software layer is configured to verify that communications obtained from the communication element originate from the extension.

10. The apparatus of claim 1, wherein the extension is configured to, in response to receiving the retrieval message:
  determine that the indicated data of the retrieval message corresponds to a second data record of the memory storage;
  locate the second data record within the memory storage; and
  generate the response message to comprise the second data record.

11. The apparatus of claim 1, wherein the first instance of the additive software layer is configured to update data in the memory storage of the extension by sending a modification message from the first instance to the communication element, wherein the communication element is configured to send the modification message to the extension, wherein the extension is configured to update data in the memory storage in response to receiving the modification message, wherein the extension is configured to, in response to receiving the modification message:
  determine that the modification message is configured to update a second data record of the memory storage with a new value;
  locate the second data record within the memory storage;
  update the second data record with the new value;
  generate a second update message indicating the second data record with the new value; and
  provide the second update message to at least a portion of the respective instances of the additive software layer, wherein the portion of the respective instances comprises the second instance, wherein the second instance is different from the first instance.

12. The apparatus of claim 1, wherein the communication element is configured to:
  monitor browser events within the page; and
  forward the browser events to the extension.

13. The apparatus of claim 1, wherein the communication element comprises an Inline Frame (iframe) element.

14. An apparatus comprising:
  an extension to a browser, wherein the browser is configured to render pages, wherein the browser comprises a client-side execution engine configured to execute code embedded in the pages, wherein the browser is configured to execute the extension, wherein the extension is a computer program product that has a memory storage that is external to the client-side execution engine of the browser; and
  a communication element that is configured to enable an instance of an additive software layer to communicate data to and from the extension, wherein the communication element is embedded within a page of a set of one or more pages, wherein the instance of the additive software layer is embedded within the page, wherein the set of one or more pages is defined over multiple domains, wherein the set of one or more pages comprises respective instances of the additive software layer, wherein the additive software layer is configured to execute a walkthrough over the multiple domains, wherein the walkthrough is configured to provide a first descriptive element in response to a first user interaction in the set of one or more pages and to provide a second descriptive element in response to a second user interaction in the set of one or more pages, wherein the multiple domains comprise a first domain and a second domain, wherein the first user interaction is directed at the first domain, wherein the second user interaction is directed at the second domain, wherein the instance of the additive software layer is configured to retrieve data from the memory storage of the extension by sending a retrieval message from the instance to the communication element, wherein the communication element is configured to send the retrieval message to the extension, wherein the extension is configured to retrieve indicated data from the memory storage in response to receiving the retrieval message and to provide a response message to the instance of the additive software layer via the communication element, wherein the instance of the additive software layer is configured to update data in the memory storage of the extension by sending a modification message from the instance to the communication element, wherein the communication element is configured to send the modification message to the extension, wherein the extension is configured to update data in the memory storage in response to receiving the modification message, wherein the apparatus comprising a processor that is configured to execute, at least, the browser, and wherein the instance of the additive software layer is configured to:
  in response to obtaining an indication of the first user interaction with the first domain, provide the first descriptive element over the page;
  update an in-memory storage of the instance to indicate that the first user interaction and the first descriptive element have been implemented; and
  notify the extension that the first user interaction and the first descriptive element have been implemented, wherein said notify comprises providing the modification message to the communication element.

15. The apparatus of claim 14, wherein elements that are associated with the first and second domains are embedded within the page, wherein the instance is configured to provide the first and second descriptive elements over the page, wherein the notification performed by the instance of the additive software layer is performed via the communication element.

16. The apparatus of claim 14, wherein the page is associated with the first domain, wherein a second page of the set of one or more pages is associated with the second domain, wherein a second instance of the additive software layer is executed over the second page to provide the second descriptive element over the second page, wherein a second communication element is embedded within the second page, wherein upon providing the second descriptive element by the second instance, the modification message is provided from the second instance to the second communication element.

17. The apparatus of claim 14, wherein the extension is configured to, upon being notified that the first user interaction and the first descriptive element have been implemented, modify the memory storage to indicate that the first user interaction and the first descriptive element have been implemented, and update the respective instances with a modified version of the memory storage, wherein the modified version indicates a current state of the walkthrough.

18. A method to be implemented at an extension to a browser, wherein the browser comprises a client-side execution engine configured to execute code embedded in pages, wherein the browser is configured to execute the extension, wherein the extension is a computer program product that has a memory storage that is external to the client-side execution engine of the browser, the method comprising:

utilizing a communication element for synchronizing data between an instance of an additive software layer and the extension, wherein the communication element is embedded within a page of a set of one or more pages, wherein the instance of the additive software layer is embedded within the page, wherein the set of one or more pages is defined over multiple domains, wherein the set of one or more pages comprises respective instances of the additive software layer, wherein the additive software layer is configured to execute a walkthrough over the multiple domains, wherein the walkthrough is configured to provide a first descriptive element in response to a first user interaction in the set of one or more pages and to provide a second descriptive element in response to a second user interaction in the set of one or more pages, wherein the multiple domains comprise a first domain and a second domain, wherein the first user interaction is directed at the first domain, wherein the second user interaction is directed at the second domain, wherein the communication element is configured to enable the instance of the additive software layer to communicate data to and from the extension, wherein said synchronizing the data comprises:
  receiving, via the communication element, a modification message from the instance of the additive software layer, wherein the modification message is configured to update data in the memory storage of the extension;
  in response to receiving the modification message, updating the data in the memory storage according to the modification message; and
  providing an updated version of the memory storage to at least a portion of the respective instances of the additive software layer via the communication element, wherein the instance of the additive software layer is configured to:
  in response to obtaining an indication of the first user interaction with the first domain, provide the first descriptive element over the page;
  update an in-memory storage of the instance to indicate that the first user interaction and the first descriptive element have been implemented; and
  notify the extension that the first user interaction and the first descriptive element have been implemented, wherein said notify comprises providing the modification message to the communication element.

19. The method of claim 18 further comprising:
embedding the communication element within the page of the set of one or more pages.

20. The method of claim 18 further comprising:
synchronizing data of in-memory storages of the respective instances of the additive software layer with the memory storage of the extension.

21. The method of claim 18 further comprising:
indicating an updated version of the memory storage to a second instance of the additive software layer that is embedded within a second page other than the page.

22. The method of claim 18 further comprising:
verifying that communications obtained from the communication element originate from the additive software layer.

23. The method of claim 18, wherein the communication element comprises an Inline Frame (iframe) element.

24. A computer program product comprising a non-transitory computer readable storage medium retaining program instructions, which program instructions when read by a processor, cause the processor to implement a method at an extension to a browser, the browser comprising a client-side execution engine configured to execute code embedded in pages, wherein the browser is configured to execute the extension, wherein the extension has a memory storage that is external to the client-side execution engine of the browser, the method comprising utilizing a communication element for synchronizing data between an instance of an additive software layer and the extension, wherein the communication element is embedded within a page of a set of one or more pages, wherein the instance of the additive software layer is embedded within the page, wherein the set of one or more pages is defined over multiple domains, wherein the set of one or more pages comprises respective instances of the additive software layer, wherein the additive software layer is configured to execute a walkthrough over the multiple domains, wherein the walkthrough is configured to provide a first descriptive element in response to a first user interaction in the set of one or more pages and to provide a second descriptive element in response to a second user interaction in the set of one or more pages, wherein the multiple domains comprise a first domain and a second domain, wherein the first interaction is directed at the first domain, wherein the second interaction is directed at the second domain, wherein the communication configured to enable the instance of the additive software layer to communicate data to and from the extension, wherein said synchronizing the data comprises:

receiving, via the communication element, a modification message from the instance of the additive software layer, wherein the modification message is configured to update data in the memory storage of the extension;

in response to receiving the modification message, updating the data in the memory storage according to the modification message; and providing an updated version of the memory storage to at least a portion of the respective instances of the additive software layer, layer via the communication element, wherein the instance of the additive software layer is configured to:

in response to obtaining an indication of the first user interaction with the first domain, provide the first descriptive element over the page;

update an in-memory storage of the instance to indicate that the first user interaction and the first descriptive element have been implemented; and notify the extension that the first user interaction and the first descriptive element have been implemented, wherein said notify comprises providing the modification message to the communication element.

25. A method for executing a walkthrough, wherein the walkthrough includes a first descriptive element that is provided in response to a first user interaction in set of one or more pages and a second descriptive element that is provided in response to a second user interaction in the set of one or more pages, wherein the set of one or more pages is defined over at least a first domain and a second domain, wherein the first user interaction is directed at the first domain, wherein the second user interaction is directed at the second domain, the method is performed using instances of an additive software layer that are embedded within the one or more pages and using a communication module that is embedded within the one or more pages, wherein the communication module is configured to enable the instances of the additive software layer to communicate data to and from an extension to a browser, wherein the extension is a computer program product that has a memory storage that is external to a client-side execution engine of the browser, whereby the instances are configured to retrieve data from and update data in the memory storage of the extension by sending messages to the communication module, which is configured to send respective messages to the extension;

the method comprising:

obtaining an indication that a user performed the first user interaction in the first domain;

in response to the indication of the first user interaction, providing the first descriptive element in a page displayed by the browser, the page is comprised by the set of one or more pages;

updating an in-memory storage of an instance of the additive software layer that is embedded in the page, wherein said updating is configured to update the in-memory storage to indicate that the first user interaction and the first descriptive element have been implemented; and notifying the extension that the first user interaction and the first descriptive element have been implemented, wherein said notifying comprises performing a modification message to the communication element, whereby causing the communication element to send the modification message to the extension and, whereby causing the extension to update data in the memory storage of the extension.

26. The method of claim 25, wherein the page is associated with the first domain, wherein a second page of the set of one or more pages is associated with the second domain, wherein a second instance of the additive software layer is executed over the second page to provide the second descriptive element over the second page, wherein a second communication element is embedded within the second page, wherein upon providing the second descriptive element by the second instance, the modification message is provided from the second instance to the second communication element.

* * * * *

UNITED STATES PATENT AND TRADEMARK OFFICE
CERTIFICATE OF CORRECTION

PATENT NO. : 11,610,050 B2
APPLICATION NO. : 17/354315
DATED : March 21, 2023
INVENTOR(S) : Nir Nahum et al.

It is certified that error appears in the above-identified patent and that said Letters Patent is hereby corrected as shown below:

In the Claims

Column 43, Lines 30 through 31, in Claim 24 should be:
wherein the communication element is configured to enable the instance of the additive software.

Signed and Sealed this
Thirteenth Day of June, 2023

Katherine Kelly Vidal
*Director of the United States Patent and Trademark Office*